United States Patent
Takahashi et al.

(10) Patent No.: US 8,705,936 B2
(45) Date of Patent: Apr. 22, 2014

(54) VIDEO DATA RECORDING DEVICE, VIDEO DATA PLAYING DEVICE, VIDEO DATA RECORDING METHOD, AND VIDEO DATA PLAYING METHOD

(75) Inventors: Shuji Takahashi, Yokohama (JP); Yasuhiro Ueki, Yokohama (JP)

(73) Assignee: JVC Kenwood Corporation (JP)

( * ) Notice: Subject to any disclaimer, the term of this patent is extended or adjusted under 35 U.S.C. 154(b) by 0 days.

(21) Appl. No.: 13/001,554

(22) PCT Filed: Mar. 18, 2010

(86) PCT No.: PCT/JP2010/054706
§ 371 (c)(1),
(2), (4) Date: Dec. 27, 2010

(87) PCT Pub. No.: WO2010/113666
PCT Pub. Date: Oct. 7, 2010

(65) Prior Publication Data
US 2012/0008915 A1    Jan. 12, 2012

(30) Foreign Application Priority Data
Mar. 30, 2009   (JP) .................................. 2009-080812

(51) Int. Cl.
*H04N 5/94*   (2006.01)

(52) U.S. Cl.
USPC .......................................... 386/246; 386/241

(58) Field of Classification Search
None
See application file for complete search history.

(56) References Cited

U.S. PATENT DOCUMENTS

| 2004/0081338 | A1  | 4/2004  | Takenaka |
| 2007/0206834 | A1* | 9/2007  | Shinkai et al. ................ 382/103 |
| 2008/0089563 | A1* | 4/2008  | Yumoto et al. ................ 382/124 |
| 2008/0100744 | A1* | 5/2008  | Lee .............................. 348/452 |
| 2009/0256858 | A1* | 10/2009 | Ogikubo et al. .............. 345/620 |

FOREIGN PATENT DOCUMENTS

| JP | 2001-086407 | 3/2001 |
| JP | 2004-062560 | 2/2004 |
| JP | 2006-058959 | 3/2006 |
| JP | 2009-017365 | 1/2009 |

OTHER PUBLICATIONS

International Search Report—PCT/JP2010/054706 dated Jun. 22, 2010.

\* cited by examiner

*Primary Examiner* — William C Vaughn, Jr.
*Assistant Examiner* — Eileen Adams
(74) *Attorney, Agent, or Firm* — Cantor Colburn LLP

(57) ABSTRACT

A video data recording device for sufficiently protecting privacy even before a mask target enters into a screen. The video data recording device includes a reference information storage unit in which reference information including predetermined features is recorded; a video data acquisition unit which acquires video data and sequentially outputs the video data to a video buffer; a similarity determining unit which compares newest video data and the reference information, and extracts partial information determined to be similar to the reference information from the newest video data; a relation determining unit which compares video data output to the video buffer before the newest video data, and the partial information determined to be similar, and extracts partial information determined to be related to the partial information determined to be similar; and an imaging recording I/F unit which records the video data and the related information related to the partial information in a recording medium.

20 Claims, 32 Drawing Sheets

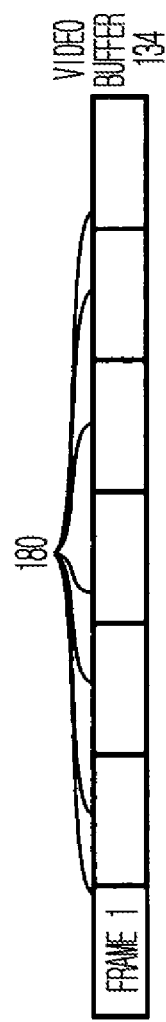

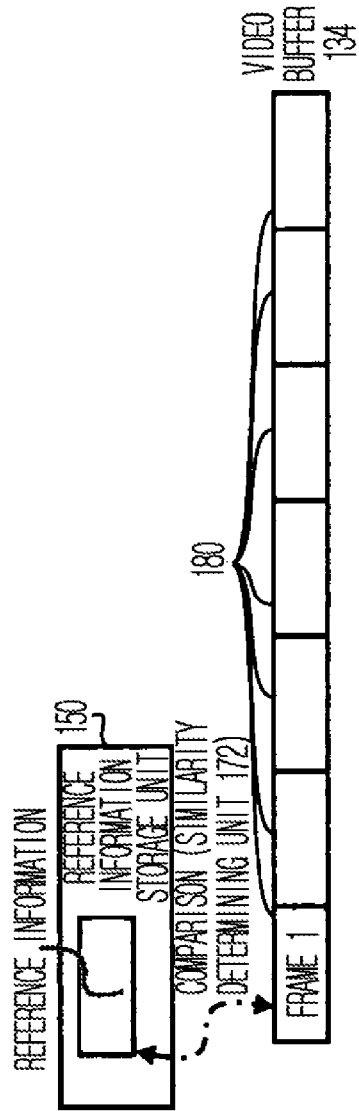

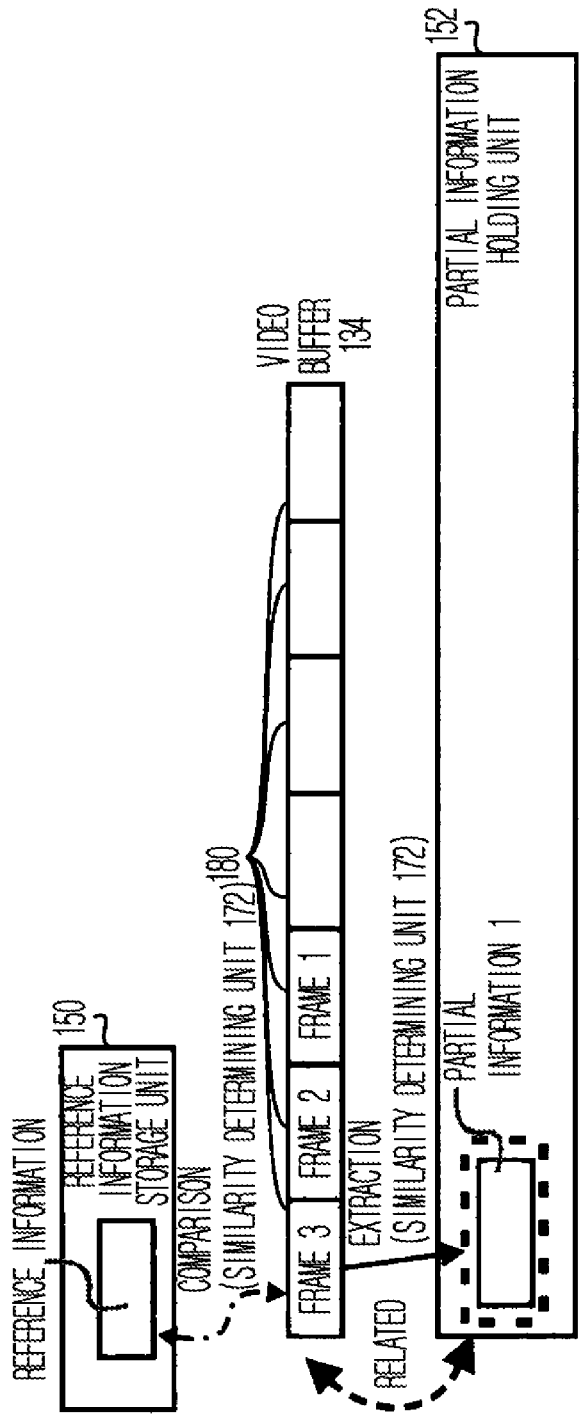

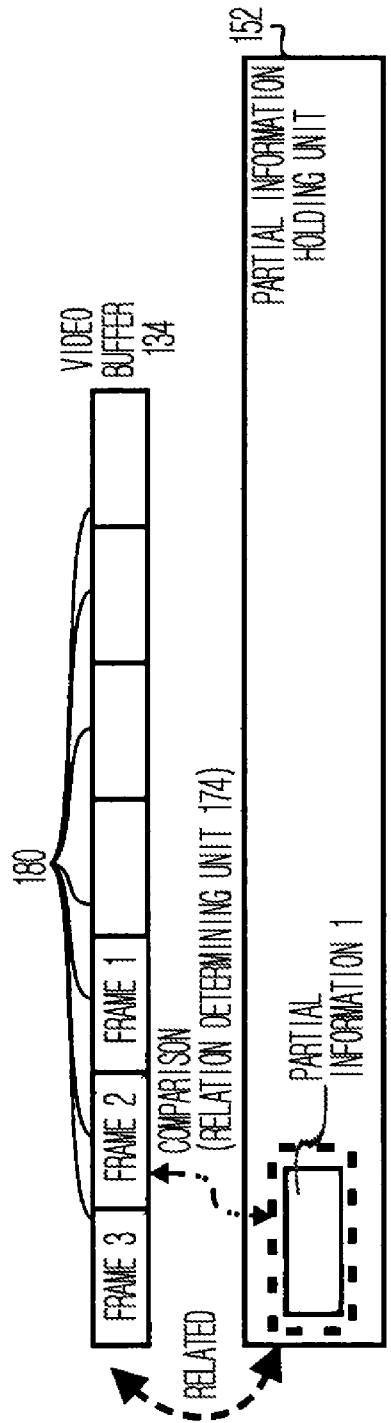

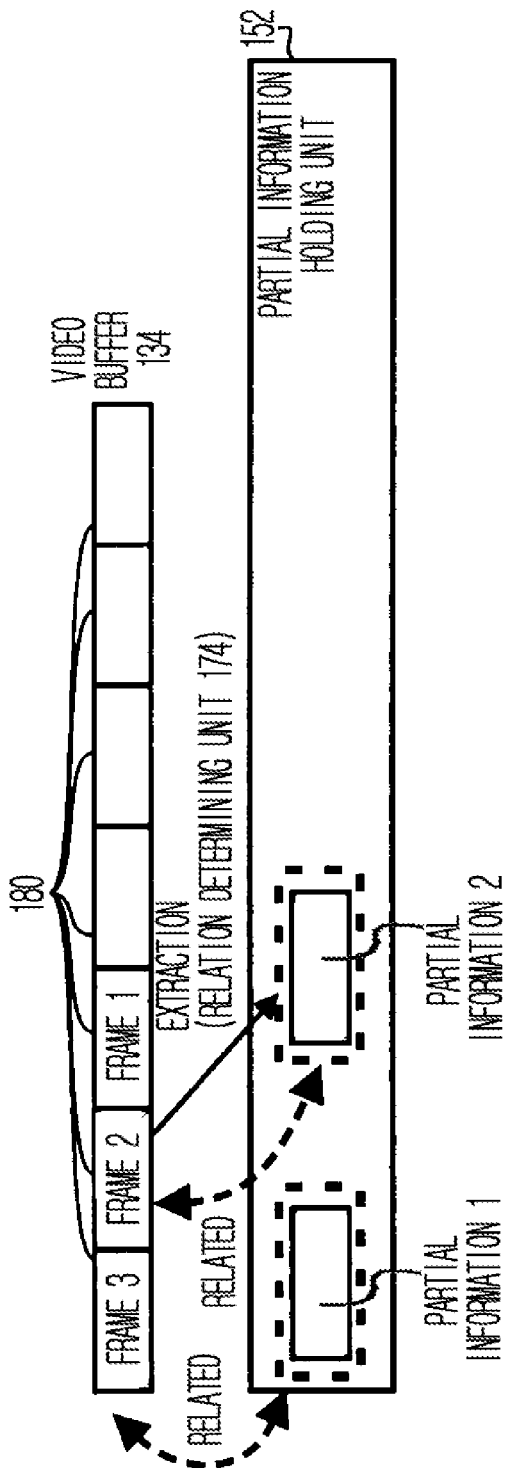

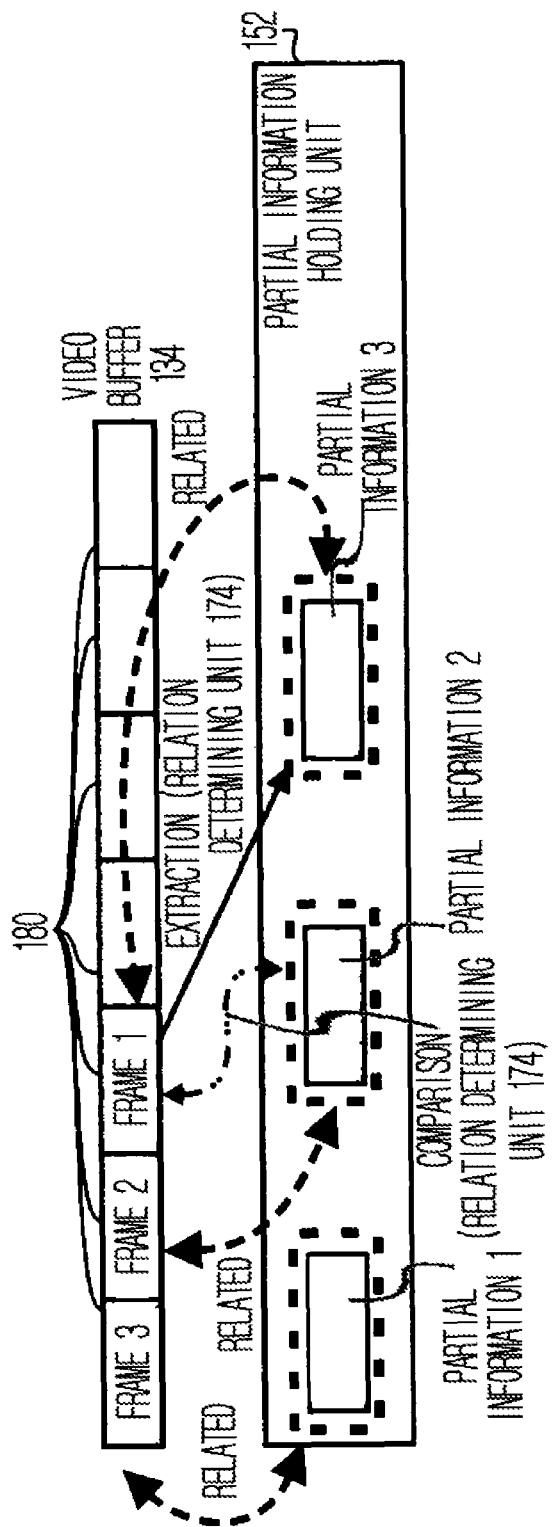

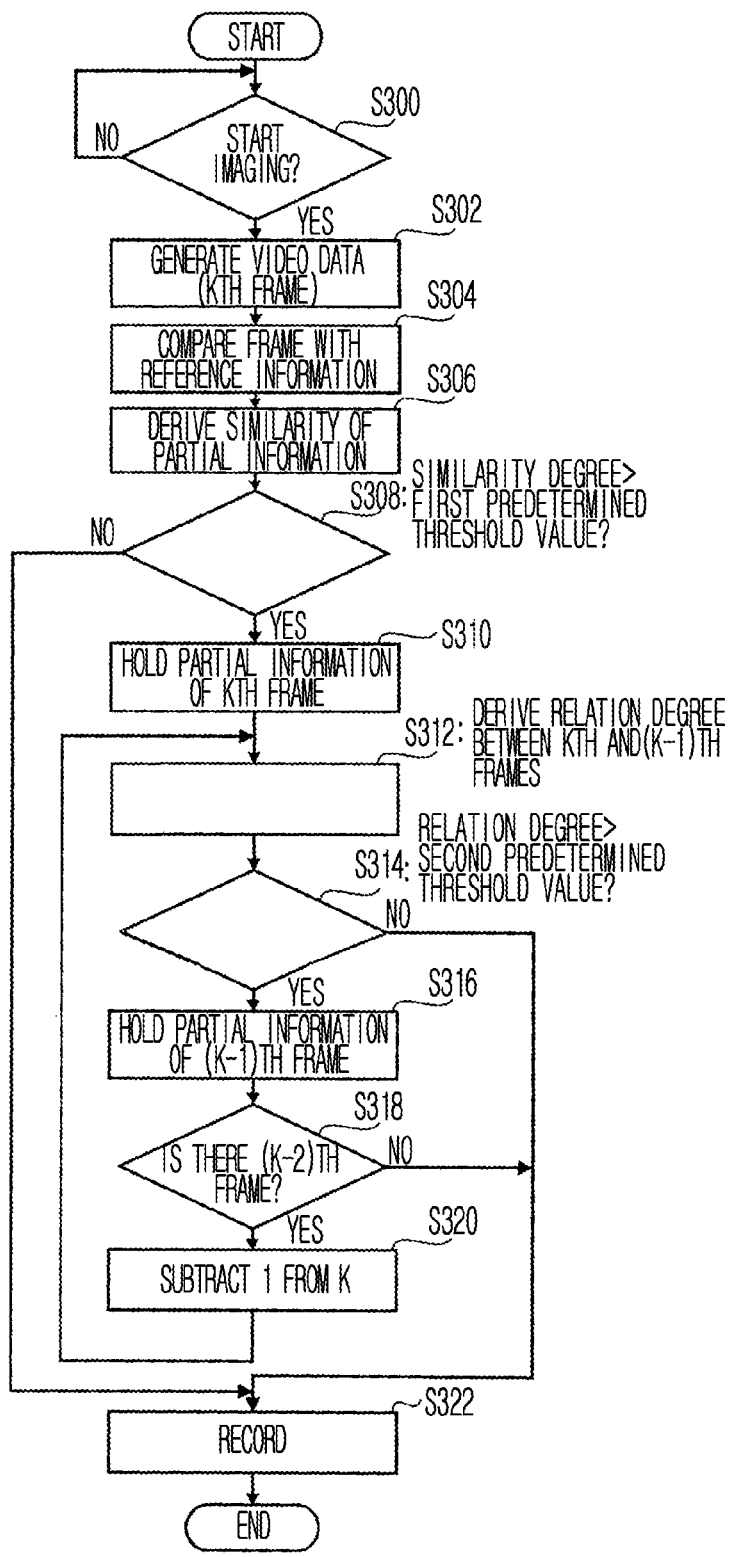

VIDEO DATA RECORDING DEVICE, VIDEO DATA PLAYING DEVICE, VIDEO DATA RECORDING METHOD, AND VIDEO DATA PLAYING METHOD

TECHNICAL FIELD

The present invention relates to a video data recording device, a video data playing device, a video data recording method, and a video data playing method for performing a mask process on a part of an image.

BACKGROUND ART

Until now, an image imaged by a DSC (digital still camera) or a digital video camera was simply used to be viewed personally. Recently, such an image is also used to be browsed by random people through a web site or a blog. However, an image imaged by an individual includes information capable of specifying the individual or an area, such as a person, a vehicle, an indicator indicating a imaged area, or the like. Accordingly, it is difficult to protect privacy of the individual if the image is open to the public as it is.

In order to protect the privacy of the individual, a mask process (a mosaic process, a fog process, a coloring process, or the like) may be performed on the person, the vehicle, the indicator, or the like that specifies the individual or the area, from the obtained image. For example, the person may not be specified by performing face detection and performing the mask process on an image of a face part, or the vehicle may not be specified by performing the mask process on a character information part of a number plate, or the area may not be specified by performing the mask process on an indicator part, such as an address, a school name, a station, a store, or the like. A technology of performing a mosaic process on such a face part image which is part of the image, is known (for example, Patent Document 1). However, since the face part is detected based on a skin color part in the image in such a technology, the mosaic process is performed with respect to all imaged face images. Accordingly, individual setup of privacy protection, such as performing the mosaic process only on a certain person or performing the mosaic process on everybody except for a certain person, could not be made by using such a technology.

Accordingly, a technology of performing a mosaic process only when a detected face image and a pre-recorded face image of a certain person are identical is disclosed (for example, Patent Document 2). In such a technology, not only face color detection, but also methods called extraction of difference with a background image, pattern matching, and extraction of face-likeness are used for face detection. Also, the precision for specifying a face is increasing since feature points such as an eye, a nose, a mouth, an ear, etc. are used as features for specifying a face after detecting the face, and resolution of a video signal (image signal) is improved. Recently, the protection of privacy of the individual is more precisely promoted as it became possible to perform the mosaic process not only on the face part, but also on character information of the number plate or character information specifying the area by comparing the character information through an OCR technology or pattern matching.

(Patent Document 1) Japanese Laid-Open Patent Publication No. 2001-086407

(Patent Document 2) Japanese Laid-Open Patent Publication No. 2004-062560

DISCLOSURE OF INVENTION

Technical Problem

In the above technologies, in order to perform a mask process on an image related with privacy of an individual from imaged video data, information (target information) that may be an object on which a mask process is performed is extracted from the video data, and the extracted target information is compared with pre-recorded reference information. Also, in the above technologies, the mask process is performed on the target information of the video data only if the target information and the reference information are identical or similar, and then the mask process is continuously performed by tracking and detecting the target information.

In other words, the mask process is performed only when existence of the target information identical or similar to the reference information is determined. Accordingly, even when an image of the target information on which the mask process is supposed to be performed appears on a screen, the mask process is not performed while similarity between the target information and the reference information is not found, i.e., while the similarity between the target information and the reference information does not reach a sufficient value as only part of the image of the target information is displayed on the screen. That is because it is not determined that the target information is identical or similar to the reference information.

Accordingly, if the mask process is required to be performed in real-time, for example, when a target person slides into the screen, the mask process is performed only when the face completely enters into the screen. Consequently, although it is partial, a face part is exposed on the screen until the mask process is performed, and thus the privacy may not be sufficiently protected.

To address the above and/or other problems, the present invention provides a video data playing device, a video data recording device, a video data playing method, and a video data recording method capable of sufficiently protecting privacy even before a target on which a mask process is to be performed (hereinafter, simply referred to as a mask target) enters into a screen.

Technical Solution

According to an aspect of the present invention, there is provided a video data recording device including: a reference information storage unit in which reference information including predetermined features is recorded; a video data acquisition unit which acquires video data and sequentially outputs the video data to a video buffer; a similarity determining unit which compares the newest video data and the reference information, and extracts partial information determined to be similar to the reference information from the newest video data; a relation determining unit which compares video data output to the video buffer before the newest video data, and the partial information determined to be similar, and extracts partial information determined to be related to the partial information determined to be similar; and a medium recording unit which records the video data and the related information related to the partial information in a recording medium.

When the partial information capable of specifying the partial image constituting a mask target is extracted, the video data recording device compares such a partial image with an image corresponding to video data held in the video buffer to retroactively extract partial information to be mask processed, and records the related information related to such partial information on the recording medium. Accordingly, since the mask process starts from video data including even a part of the mask target when the recording medium is played, privacy may be sufficiently protected even before the mask target completely enters into a screen.

The similarity determining unit may derive similarity degree indicating a degree of similarity with the reference information, and determine whether the partial information is similar based on whether the similarity degree exceeds a first predetermined threshold value, and the relation determining unit may derive relation degree indicating a degree of relation with the partial information determined to be similar, and determine whether the partial information is related based on whether the relation degree exceeds a second predetermined threshold value.

It is possible to suitably determine based on numeral comparison whether the mask process is required, by using structures for numerically expressing the degrees of similarity and relation respectively as the similarity degree and the relation degree.

The video data acquisition unit may include an imaging unit that generates video data by imaging a subject. From this configuration, the imaged video data and the related information related to the partial information of the mask target extracted from the video data may be recorded on the recording medium while the subject is imaged, and thus privacy-protected video data may be easily generated.

A video data playing device for playing a recording medium generated by the video data recording device includes: a video data acquisition unit which acquires, from a recording medium on which related information related to partial image corresponding to partial information of video data determined to be similar to reference information including predetermined features, and partial information of video data determined to be related to the partial information determined to be similar, and video data are recorded, the related information and the video data; a mask processing unit which performs a mask process on the partial image specified by the related information in the video data; and a video data output unit which outputs the mask processed video data.

The video data and the related information capable of specifying the partial image constituting the mask target are recorded on the recording medium generated by the video data recording device. Accordingly, since the video data playing device may immediately perform the mask process from a point of time when even the part of the mask target appears on the screen when the recording medium is played, the privacy may be sufficiently protected even before the mask target completely enters into the screen.

According to another aspect of the present invention, there is provided a video data playing device including: a reference information storage unit in which reference information including predetermined features is recorded; a video data acquisition unit which acquires video data and sequentially outputs the video data to a video buffer; a similarity determining unit which compares newest video data and the reference information, and extracts partial information determined to be similar to the reference information from the newest video data; a relation determining unit which compares video data output to the video buffer before the newest video data, and the partial information determined to be similar, and extracts partial information determined to be related to the partial information determined to be similar; a mask processing unit which performs a mask process on a partial image specified by the partial information with respect to the video data; and a video data output unit which outputs the mask processed video data.

When the partial information capable of specifying the partial image constituting a mask target is extracted, the video data playing device compares such a partial image with an image corresponding to video data held in the video buffer to retroactively extract the partial information. Also, the video data playing device performs the mask process, for example just before output, with respect to the partial image specifiable by the partial information. Accordingly, privacy may be sufficiently protected even before the mask target completely enters into a screen since the mask process may start from video data including even a part of the mask target.

The similarity determining unit may derive similarity degree indicating a degree of similarity with the reference information, and determine whether the partial information is similar based on whether the similarity degree exceeds a first predetermined threshold value, and the relation determining unit may derive relation degree indicating a degree of relation with the partial information determined to be similar, and determine whether the partial information is related based on whether the relation degree exceeds a second predetermined threshold value.

The mask process may be performed by suitably determining based on numeral comparison whether the mask process is required, by using structures for numerically expressing the degrees of similarity and relation respectively as the similarity degree and the relation degree.

According to another aspect of the present invention, there is provided a video data recording method including: recording reference information including predetermined features; acquiring video data and sequentially outputting the video data to a video buffer; comparing newest video data with the reference information, and extracting partial information determined to be similar to the reference information from the newest video data; comparing video data output to the video buffer before the newest video data, and the partial information determined to be similar, and extracting partial information determined to be related to the partial information determined to be similar; and recording the video data and the related information related the partial information on a recording medium.

According to another aspect of the present invention, there is provided a video data playing method including: recording reference information including predetermined features; acquiring video data and sequentially outputting the video data to a video buffer; comparing newest video data and the reference information, and extracting partial information determined to be similar to the reference information from the is newest video data; comparing video data output to the video buffer before the newest video data, and the partial information determined to be similar, and extracting partial information determined to be related to the partial information determined to be similar; performing a mask process on a partial image specified by the partial information with respect to the video data; and outputting the mask processed video data.

The elements corresponding to the technical idea of the video data recording device or the video data playing device, or the descriptions thereof may be applied to the video data recording method or the video data playing method.

According to another aspect of the present invention, there is provided a video data playing device including: a reference information storage unit in which reference information including predetermined features is recorded; a video data acquisition unit which acquires video data and sequentially outputs the video data to a video buffer; a target information extract unit which extracts, from newest video data, target information capable of specifying a partial image of the newest video data as a comparison target of the reference information, and holds the target information in relation to the newest video data; a similarity determining unit which determines whether the extracted target information is similar to the reference information, and assigns a mask flag indicating a mask target to target information determined to be similar; a relation determining unit which, when it is determined that the target information is similar to the reference information, determines whether one or more pieces of target information held before the target information determined to be similar is related to the target information determined to be similar, and assigns the mask flag to the target information determined to be related; a mask processing unit which, when the mask flag is assigned to the target information in relation to the video data in the video buffer, performs a mask process on a partial image specifiable by the target information of the video data; and a video data output unit which outputs the mask processed video data.

When the video data is held in the video buffer and the target information constituting a mask target is recognized, the video data playing device assigns the mask flag to all target information related to the target information to perform the mask process, for example, just before output, with respect to the partial image specifiable by the target information assigned with the mask flag. Accordingly, privacy may be sufficiently protected even before the mask target completely enters into a screen, since the mask process may start from video data including even a part of the mask target The similarity determining unit may derive similarity degree indicating a degree of similarity between the reference information and the target information, and determine whether the reference information and the target information are similar based on whether the similarity degree exceeds a first predetermined threshold value, and the relation determining unit may derive relation degree indicating a degree of relation between the held one or more pieces of target information and the target information determined to be similar, and determine whether the held one or more pieces of target information and the target information determined to be similar are related based on whether the relation degree exceeds a second predetermined threshold value.

The mask process may be performed by suitably determining based on numeral comparison whether the mask process is required, by using structures for numerically expressing the degrees of similarity and relation respectively as the similarity degree and the relation degree.

According to another aspect of the present invention, there is provided a video data recording device including: a reference information storage unit in which reference information including predetermined features is recorded; a video data acquisition unit which acquires video data; a target information extract unit which extracts, from newest video data, target information capable of specifying a partial image of the newest video data as a comparison target of the reference information, and holds the target information, in relation to the newest video data; similarity determining unit which determines whether the extracted target information is similar to the reference information, and assigns a mask flag indicating a mask target to the target information determined to be similar; a relation determining unit which, when it is determined that the target information is similar to the reference information, determines whether one or more pieces of target information held before the target information determined to be similar are related to the target information determined to be similar, and assigns the mask flag to the a partial image specifiable by target information determined to be related; and a medium recording unit which records the video data and related information related to a partial image specifiable by the target information assigned with the mask flag on a recording medium.

When the target information constituting a mask target is recognized, the video data recording device assigns the mask flag even to target information related to the target information to record the related information related to the partial image specifiable by the target information on the recording medium. Accordingly, since the mask process starts from video data including even a part of the mask target when the recording medium is played, privacy may be sufficiently protected even before the mask target completely enters into a screen.

The similarity determining unit may derive similarity degree indicating a degree of similarity between the extracted target information and the reference information, and determine whether the extracted target information and the reference information are similar based on whether the similarity degree exceeds a first predetermined threshold value, and the relation determining unit may derive a relation degree indicating a degree of relation between the held one or more pieces of target information and the target information determined to be similar, and determine whether the held one or more pieces of target information and the target information determined to be similar are related based on whether the relation degree exceeds a second predetermined threshold value.

It is possible to suitably determine based on numeral comparison whether the mask process is required, by using structures for numerically expressing the degrees of similarity and relation respectively as the similarity degree and the relation degree.

The video data acquisition unit may include an imaging unit that generates video data by imaging a subject. From this configuration, while the subject is imaged, the imaged video data, and the related information for performing the mask process on the partial image specifiable by the target information in relation to the video data may be recorded on the recording medium, and thus the video data in which the privacy is protected may be easily generated.

According to another aspect of the present invention, there is provided a video data playing device including: a video data acquisition unit which acquires, from a recording medium on which target information extracted from video data by being determined to be similar to reference information including predetermined features, related information related to target information extracted from the video data by being determined to be related to the target information determined to be similar, and the video data are recorded, the related information and the video data; a mask processing unit which, if the related information is related to the acquired video data, performing a mask process on a partial image specified by the related information; and a video data output unit which outputs the mask processed video data.

In the present invention, the video data and the related information capable of specifying the partial image to be mask processed are recorded on the recording medium. In the video data playing device, since the mask process may be immediately performed at a point of time when even a part of the mask target appears on a screen by recognizing the mask target almost in real time by the related information while the recording medium is played, privacy may be sufficiently protected even before the mask target completely enters into a screen.

According to another aspect of the present invention, there is provided a video data playing method including: recording reference information including predetermined features; acquiring video data and sequentially outputting the video data to a video buffer; extracting, from newest video data, target information capable of specifying a partial image of the newest video data as a comparison target of the reference information, and holding the target information in relation to the newest video data; determining whether the extracted target information is similar to the reference information, and assigning a mask flag indicating a mask target to target information determined to be similar; if it is determined that the target information is similar to the reference information, determining whether one or more pieces of target information held before the target information determined to be similar is related to the target information determined to be similar, and assigning the mask flag to the target information determined to be related; if the mask flag is assigned to the target information in relation to the video data in the video buffer, performing a mask process on a partial image specifiable by the target information of the video data; and outputting the mask processed video data.

According to another aspect of the present invention, there is provided a video data recording method including: recording reference information including predetermined features; acquiring video data; extracting, from newest video data, target information capable of specifying a partial image of the newest video data as a comparison target of the reference information, and holding the target information in relation to the newest video data; determining whether the extracted target information is similar to the reference information, and assigning a mask flag indicating a mask target to target information determined to be similar; if it is determined that the target information is similar to the reference information, determining whether one or more pieces of target information held before the target information determined to be similar are related to the target information determined to be similar, and assigning the mask flag to the target information determined to be related; and recording the video data and related information related to the target information assigned with the mask flag on a recording medium.

The elements corresponding to the technical idea of the video data recording device or the video data playing device, or the descriptions thereof may be applied to the video data recording method or the video data playing method.

Advantageous Effects

According to the present invention, privacy can be sufficiently protected even before a mask target capable of specifying an individual or an area completely enters into a screen, by retroactively performing a mask process even on video data in which part of the mask target initially appears.

BRIEF DESCRIPTION OF THE DRAWINGS

FIGS. 4A through 4D are diagrams for explaining processes of a similarity determining unit according to the embodiment 1 of the present invention;

FIGS. 5A through 5C are diagrams for explaining processes of a relation determining unit according to the embodiment 1 of the present invention;

FIG. 10 is a flowchart showing a flow of processes of a video data recording method according to the embodiment 1 of the present invention;

Figure 1:
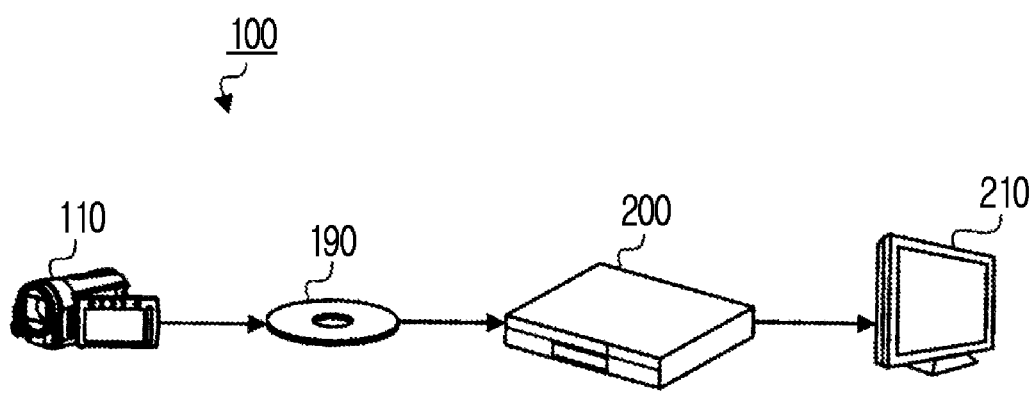
FIG. 1 is a diagram for explaining a schematic connection relationship of a system for recording and playing video data, according to an embodiment 1 of the present invention.

EXPLANATION OF REFERENCE NUMERALS 200, 380, 700: Video Data Playing Device
230, 382, 430, 730: Video Data Acquisition Unit
134, 434: Video Buffer
240, 436: Mask Processing Unit 242, 442: Video Data Output Unit
150, 450: Reference Information Storage Unit
470: Target Information Extract Unit
172, 472: Similarity determining unit
174, 474: Relation determining unit
190, 384, 650: External Recording Medium (Recording Medium)
110, 610: Video Data Recording Device
130, 620: Imaging Unit
136, 624: Imaging Recording I/F Unit (Medium Recording Unit)

BEST MODE FOR CARRYING OUT THE INVENTION

Hereinafter, exemplary embodiments of the present invention will be described in detail with reference to attached drawings. Measurements, materials, and other numbers in the embodiments are used for easy understanding of the invention, and do not limit the present invention unless specifically mentioned. Like reference numerals in the drawings and specification denote like elements to omit overlapping descriptions, and an element that is not directly related to the present invention is not shown.

An image imaged by an individual can be easily open to the public according to supply of digital still cameras or digital video cameras, and increasing speed of internet connections. However, the image imaged by the individual includes information capable of specifying the individual or an area. Accordingly, when the image is made public as it is, it is difficult to protect privacy of the individual. In particular, for a person's face or a character string specifying an address, an individual or an area may be specified even when a part of the face or character string is made public.

According to the present embodiment, the privacy is sufficiently protected even before a mask target capable of specifying the individual or the area, such as the face or the address, as described above completely enters into a screen. Hereinafter, a configuration of a video data recording device and a video data recording method using the video data recording device will be described, and then a configuration of a video data playing device and a video data playing method using the video data playing device will be described, according to present embodiment.

Then, a video data playing device and a video data playing method using the video data playing device, and a video data recording device and a video data recording method using the video data recording device, according to a different embodiment, will be described.

(Embodiment 1: System 100 for Recording and Playing Video Data)

FIG. 1 is a diagram for explaining a schematic connection of the system 100 for recording and playing video data, according to an embodiment 1 of the present invention.

As shown in FIG. 1, the system 100 for recording and playing video data includes a video data recording device 110, an external recording medium 190, a video data playing device 200, and a display 210.

The video data recording device 110 records video data acquired through imaging on the external recording medium 190 as a recording medium. Here, the video data recording device 110 also records related information related to partial information to be mask processed, in relation to a frame corresponding to a unit image of the video data. Also, the video data playing device 200 plays the external recording medium 190, on which the video data and the related information are recorded by the video data recording device 110 while performing a mask process by referring to the related information, and output to the display 210.

Here, the video data may be moving image data corresponding to a plurality of consecutive frames or a plurality of consecutive still image data. In following embodiments, the moving image data corresponding to the plurality of consecutive frames is described as the video data. Also, a frame denotes data corresponding to an image for one screen forming the moving image data, and may be used as a unit image for encoding in an encoding method, such as M-JPEG, MPEG-2, or H.264. A word of frame will be used when the frame denotes a unit image of video data.

(Video Data Recording Device 110)

Figure 2:
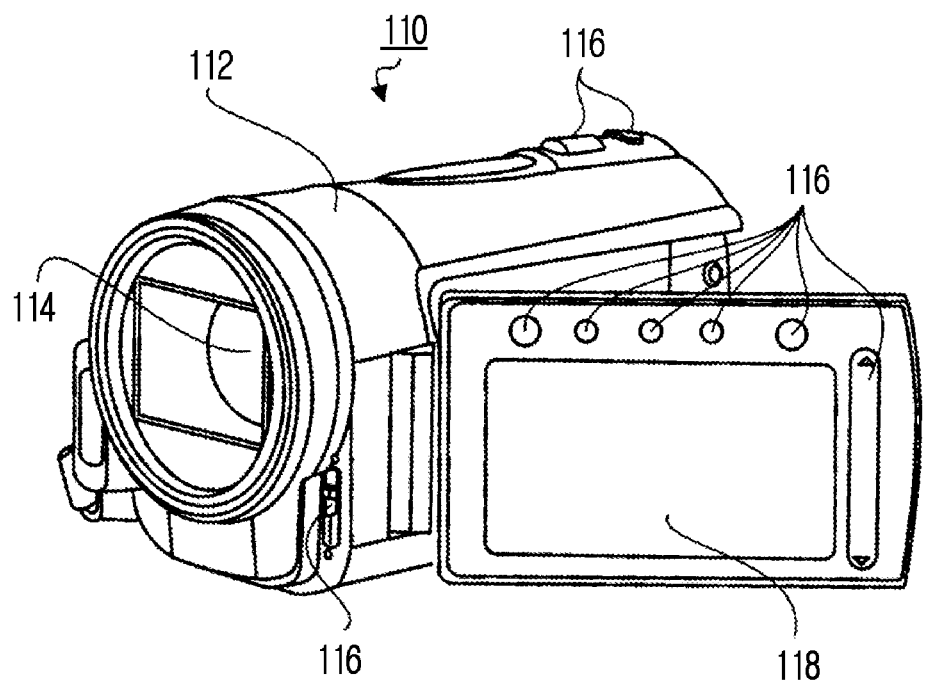
FIG. 2 is an exterior view showing an example of a video data recording device according to the embodiment 1 of the present invention.

FIG. 2 is an exterior view showing an example of the video data recording device 100 according to the embodiment 1 of the present invention. According to the present embodiment, an example of the vide data recording device 110 includes a digital video camera, but is not limited thereto, and may include any other recording device capable of recording a frame on a recording medium, such as a digital still camera, an HDD recorder, a DVD recorder, a Blu-ray disc recording device, or the like.

The video data recording device 110 includes a main body 112, an imaging lens 114, an imaging operation unit 116, and a view finder (liquid crystal display monitor) 118.

The video data recording device 110 includes the body 112 held by a user, and records a video signal imaged by the imaging lens 114 to be reviewable as video data. The video data recording device 110 adjusts a recording timing or a viewing angle according to a user input made to the imaging operation unit 116. Also, the video data recording device 110 receives a switching input of a imaging mode, such as an outdoor, an indoor, a night view, or the like, from the user, and performs a process corresponding to the switching input. During imaging, the user may refer to recorded video data by viewing an image displayed on the view finder, and thus is able to capture a subject in a desired location and occupied area. Such a view finder 118 may be a liquid crystal display, an organic EL display, or the like.

Figure 3:
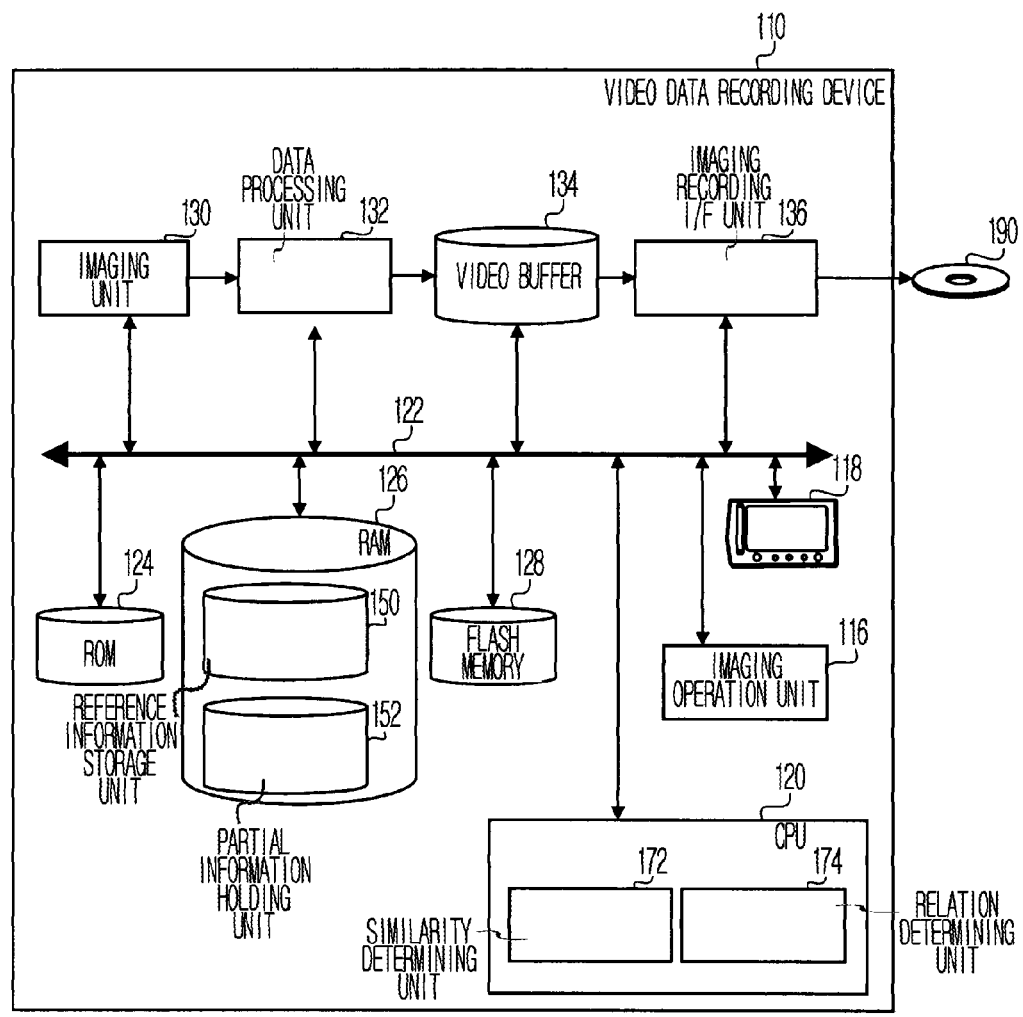
FIG. 3 is a functional block diagram showing a schematic hardware configuration of the video data recording device, according to the embodiment 1 of the present invention.

FIG. 3 is a functional block diagram showing a schematic hardware configuration of the video data recording device 110, according to the embodiment 1 of the present invention. The video data recording device 110 includes a CPU 120, a bus 122, a ROM 124, a RAM 126, a flash memory 128, the imaging operation unit 116, the view finder 118, an imaging unit 130 operating as a video data acquisition unit, a data processing unit 132, a video buffer 134, and an imaging recording I/F unit 136 operating as a medium recording unit.

The CPU 120 manages the entire video data recording device 110 based on a program stored in the ROM 124. In detail, the CPU 120 controls the ROM 124, the RAM 126, the flash memory 128, the imaging operation unit 116, the view finder 118, the imaging unit 130, the data processing unit 132, the video buffer 135, and the imaging recording I/F unit 136, which will be described later, through the bus 122.

The ROM 124 stores a program executed by the CPU 120. The RAM 126 stores variables while executing the program. The flash memory 128 is a nonvolatile memory, and may hold the recorded data even when power supply is cut off. Accordingly, when the power supply is cut off, the flash memory 128 stores reference information that will be described later, instead of the RAM 126.

The imaging operation unit 116 includes a switch, such as a manipulation key including a release switch, a cross key, a joy stick, or the like, and receives a manipulation input of the user. The view finder 118 displays a view image (video) of the video data acquired by the imaging unit 130.

The imaging unit 130 generates the video data (frame) from the video signal obtained by imaging the subject. The data processing unit 132 forms luminance data or color data with respect to the video data generated by the imaging unit 130. Hereinafter, the video data includes the luminance data or the color data.

The video buffer 134 temporarily holds the video data generated by the imaging unit 130, specifically holds a frame corresponding to one screen. Also, the video buffer 134 operates as a shift register for shifting a past frame whenever the imaging unit 130 generates a frame. According to the present embodiment, for example, the video buffer 134 may hold, video data having a bit rate of about 750 Mbps in which a frame having resolution of 1920×1080 pixels is transmitted at 30 frames/sec, with the amount of the video data corresponding to a recording time of about 10 seconds.

The imaging recording I/F unit 136 records the video data and related information for a mask process described later, on the predetermined external recording medium 190. A recording medium having a disc shape, such as a DVD, a Blu-ray disc, or the like, is introduced as the external recording medium 190, but any other recording medium, such as a flash memory, HDD, or the like may be applied as the external recording medium 190.

The RAM 126 may functions as a reference information storage unit 150 and a partial information holding unit 152 in association with the CPU 120 and other elements.

The reference information storage unit 150 pre-stores reference information including predetermined features. The reference information, as described above, is held in the flash memory 128 instead of the RAM 126, when the power supply is cut off. Here, for example, when the reference information is information about a face, the predetermined features includes indicator values, such as an occupied area of a partial is image, which is based on the information about the face as the reference information, (hereinafter, simply referred to as a reference face image) in a screen, feature points (relative locations of feature parts, such as an eye, a mouth, a nose, an ear, etc.) of the reference face image, a distance between the feature points, a size of a feature part, an outline and luminance of the reference face image, a skin color, a hair color, an amount of hair, etc. In the present embodiment, the reference information is described with an example of the information about the face, but is not limited thereto, and may be information for extracting the features by using any conventional technology, such as information about a vehicle, information about a building, information about a letter, or the like.

The partial information holding unit 152 holds partial information extracted by a similarity determining unit 172, which will be described later, from a newest frame (video data), in relation to the newest frame (frame corresponding to an extraction source of the partial information). The partial information includes related information which includes coordinate information indicating a location and a size in an image of one screen corresponding to the related frame and specifies a partial image including an image in which frame is displayed, by the coordinate information, and a partial image for smoothly comparing images, which will be described later, to each other.

Also, the CPU 120 may function as the similarity determining unit 172 and a relation determining unit 174 in association with the RAM 126 and other elements.

The similarity determining unit 172 compares the newest frame (video data) generated by the imaging unit 130 with the reference information, and when it is determined that part of the frame is similar to the reference information, extracts partial information determined to be similar to the reference information from the frame to hold the partial information in the partial information holding unit 152 in relation to the frame.

While extracting the partial information, the similarity determining unit 172 extracts the same information as the above-described reference information, i.e., the indicator values, such as the occupied area of the partial image based on the information about the face in the screen, the feature points (the relative locations of feature parts such as the eye, the mouth, the nose, the ear, etc.), the distance between the feature points, the size of a feature part, the outline and luminance, the skin color, the hair color, the amount of hair, etc., from a predetermined location of the frame.

The similarity determining unit 172 compares the extracted indicator values with indicator values of features of the reference information recorded in the reference information storage unit 150, and derives similarity degree indicating a degree of similarity with the reference information by evaluating an image around the partial image in overall.

In detail, the similarity determining unit 172 refers to an area other than the partial image estimated to be the face, for example, whether an image of a neck, a body, a lower body, or the like can be detected near the partial image estimated to be the face, whether a height of a detected person is extremely too high or too short compared to a height of another person in the screen, or the like. The similarity determining unit 172 derives the similarity degree by evaluating and determining the area other than the partial image in overall, for example, by giving a weighting to an evaluation value of the skin color or the hair color, and recognizing as the face.

The similarity determining unit 172 determines that the reference information and the partial information are similar when the similarity degree with the reference information exceeds a first predetermined threshold value, and holds the partial information in the partial information holding unit 152, as a mask target.

Further, in some cases, features may not be extracted only by the determination of similarity. One example of the cases is that, among the image which corresponds to the frame pre-recorded in the video buffer 134 and is determined not to include the partial image whose similarity exceeds the first predetermined threshold value, since the face does not sufficiently appear on the screen and thus features may not be extracted from the image despite that the face is the same as a face of the reference information, partial information whose similarity degree is derived as low may be included.

So as to determine such partial information to be the mask target, the relation determining unit 174 compares a frame output to the video buffer 134 before the newest frame with the partial information determined to be similar, and extracts partial information determined to be related to the partial information determined to be similar.

Here, the relation determining unit 174 derives relation degree indicating a degree of relation with the partial information determined to be similar, and determines whether the partial information is related based on whether the derived relation degree exceeds a second predetermined threshold value.

As described above, since the video data is imaged, for example, at 30 frames/second, it is highly possible that the same partial information is imaged at the same coordinate in the same size between frames in which imaging time difference is very small (for example 1/30 second) unless the subject moves at a quite high rate.

Thus, the relation determining unit 174 compares the image corresponding to the frame with the partial image held as the partial information while considering frame correlation, i.e., a distance between a coordinate indicated by the partial information, in which the similarity degree exceeds the first predetermined threshold value, and a coordinate indicated by each partial image of the image generated from a frame before the frame including the partial information determined to be similar, and a size of the partial image, and derives the relation by evaluating and determining whether the two images are related in overall.

As described above, the mask process may be performed by suitably determining whether the mask process is required based on numeral comparison, by using structures for numerically expressing the degrees of similarity and relation respectively as the similarity and the relation.

The relation determining unit 174, next, holds the partial information determined to be related in the partial information holding unit 152, as the mask target.

While extracting the partial information, instead of immediately holding the partial information in which the relation degree is equal to or above the second predetermined threshold value, in the partial information holding unit 152, the relation determining unit 174 may extract partial information having a different size or location by arbitrarily changing the size or location of the extraction target, near a location indicated by the partial information, and hold only partial information having the maximum relation degree from among the extracted partial information in the partial information holding unit 152.

Accordingly, the partial information having the highest relation degree, i.e., the partial information more accurately indicating only the image of the face without including a surplus image, may be selected from the partial information having a slight difference in the location or size of the face of the same target in the same frame, and be held in the partial information holding unit 152.

FIGS. 4A through 4D are diagrams for explaining processes of the similarity determining unit 172 according to the embodiment 1 of the present invention, and FIGS. 5A through 5C are diagrams for explaining processes of the relation determining unit 174 according to the embodiment 1 of the present invention. Here, FIGS. 4 and 5 show a series of continuous processes. Referring to FIGS. 4 and 5, in order to describe a moving process of a frame in time series, the video buffer 134 is divided into memory regions 180 each for storing one frame of the video data. The generated frame is input to the left end memory region 180, shifted to the right according to a generation timing of the frame, and output from the right end memory region 180. Here, for convenience of description, a number of memory regions 180 is 7.

In FIG. 4A, frame 1 constituting an initial frame of video data initially generated by the imaging unit 130 is held in the video buffer 134.

Then, as shown in FIG. 4B, the similarity determining unit 172 compares the frame 1 held in the video buffer 134 with the reference information recorded in the reference information storage unit 150 (a combination of comparison is shown in two arrows of a one-dot dashed line). Here, it is determined that partial information was not extracted from the frame 1 because there was no partial information determined to be similar to the reference information.

Figure 4C:
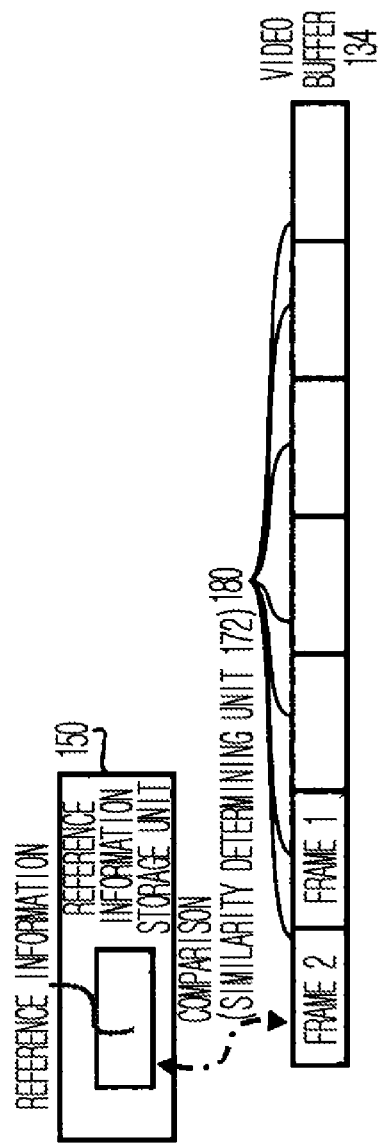

Then, as shown in FIG. 4C, the frame 1 is shifted once to the right memory region 180 so that a frame 2 constituting a next frame acquired by the imaging unit 130 is newly held. Then, like FIG. 4B, the similarity determining unit 172 compares the frame 2 held in the video buffer 134 with the reference information recorded in the reference information storage unit 150. Here, it is also determined that partial information was not extracted from the frame 2 as there was no partial information determined to be similar to the reference information.

Similarly, with respect to a frame 3 continuously generated, the similarity determining unit 172 compares the frame 3 held in the video buffer 134 with the reference information recorded in the reference information storage unit 150. Here, it is determined that partial information 1 was extracted as partial information (in which similarity exceeds the first predetermined threshold value) determined to be similar to the reference information from the frame 3. The similarity determining unit 172 holds the partial information 1 in the partial information holding unit 152, in relation to the frame 3.

When the partial information 1 is determined to be similar to the reference information as in FIG. 4D, the relation determining unit 174 compares, from among frames other than frame 3, a newer frame, (a frame of the memory region 180 disposed more left in the video buffer 134), i.e., the frame 2, with the partial information 1 (a combination of comparison is shown in two arrows of a two-dot dashed line in FIG. 5A), and derives relation degree, as shown in FIG. 5A.

Then, the relation determining unit 174 extracts partial information 2 in which the derived relation degree exceeds the second predetermined threshold value (extraction is shown in an unbroken line arrow in FIG. 5B), and holds the partial information 2 in relation to the frame 2, in the partial information holding unit 152.

Also, the relation determining unit 174 compares the partial information 2, which is determined to be related, with an older frame just before the frame 2, i.e., the frame 1, and derives relation degree. Also, the relation determining unit 174 extracts partial information 3 in which the derived relation degree exceeds the second predetermined threshold value, and holds the partial information 3 in relation to the frame 1, in the partial information holding unit 152.

Also, in FIG. 5A, when the relation determining unit 174 compared the partial information, which is determined to be similar (or related), with the frame 2 and could not extract the partial information as there was no partial information in which the relation degree exceeds the second predetermined threshold value, i.e., when the partial information related between the frame 2 and the frame 3 disappeared, the relation determining unit 174 ends comparison between the partial information and the frame older than the partial information (the frame of the memory region 180 disposed more right than frame 3 in the video buffer 134 of FIG. 5).

Also, the relation determining unit 174 may derive relation degree of not only the frame output to the video buffer 134 before the newest frame as described above, but also of a frame output after the newest frame, with respect to the partial information determined to be similar by the similarity determining unit 172.

In other words, after completing a deriving process of the relation degree with the newest frame with respect to the partial information determined to be similar by the similarity determining unit 172, the relation determining unit 174 determines relation of partial information held in relation to one shifted previous frame, with the newest frame. For example, the relation determining unit 174 determines the relation in an inverse direction (a direction to a newer frame). Also, when the relation degree exceeds the second predetermined threshold value, the relation determining unit 174 extracts partial information held in relation to the newest frame.

The imaging recording I/F unit 136 records the related information on the external recording medium 190 while sequentially recording the frames as the video data. According to the present embodiment, the related information, as described above, is obtained by removing the partial image from the partial information, and includes the coordinate information indicating the location and size in the screen from among the image of one screen corresponding to the frame. However, the example of the related information is not limited thereto as long as the related information specifies an image area on which a mask process is performed. The video data playing device 200, which will be described later, reads the frame and the related information from the external recording medium 190, and performs the mask process based on the related information before outputting the frame to the display 210. Accordingly, it is possible to perform the mask process even when the partial image does not completely enter into the screen.

As described above, according to the video data recording device 110 of the present embodiment, when the partial information capable of specifying the partial image constituting the mask target is extracted, the partial image and the image corresponding to the frame held in the video buffer 134 are compared to extract the partial information on which the mask process is retroactively to be performed. Also, the video data recording device 110 records the related information related to the partial information and capable of specifying the partial image constituting the mask target, in the external recording medium 190. Accordingly, while playing the external recording medium 190, since the mask process starts from the frame including even a part of the mask target, it is possible to sufficiently protect privacy even before the mask target completely enters into the screen. Here, the mask process is a process of limiting specifiable information, such as mosaic, a fog process, coloring, or the like.

Also, through a configuration of the video data recording device 110 including the imaging unit 130, it is possible to easily generate video data whose privacy is protected, since the subject is imaged and simultaneously video data imaged thereby and the related information related to the partial information of the mask target extracted from the frame included in the video data can be recorded in the external recording medium 190.

(Video Data Playing Device 200)

Then, the video data playing device 200 for outputting the video data, in which the mask process has been performed on the partial image constituting the mask target by reading the video data and the related information from the external recording medium 190, will be described by using the above-described video data recording device 110.

Figure 6:
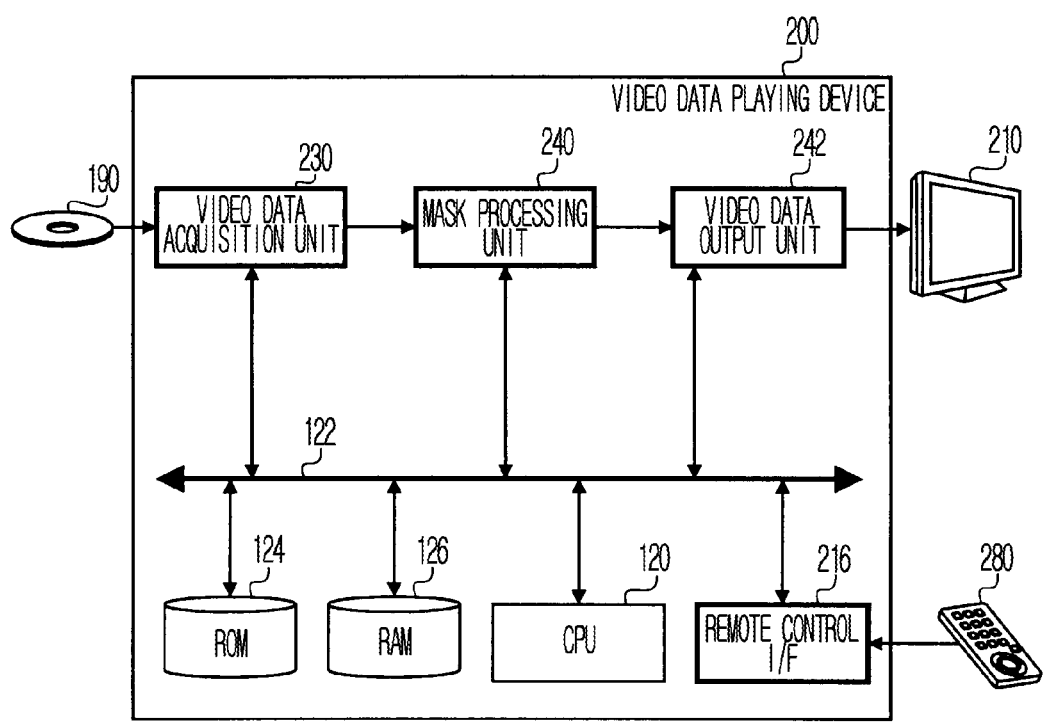
FIG. 6 is a functional block diagram showing a schematic hardware configuration of a video data playing device, according to the embodiment 1 of the present invention.

FIG. 6 is a functional block diagram showing a schematic hardware configuration of the video data playing device 200, according to the embodiment 1 of the present invention. The video data playing device 200 includes a CPU 120, a bus 122, a ROM 124, a RAM 126, a remote control I/F 216, a video data acquisition unit 230, a mask processing unit 240, and a video data output unit 242.

Since the CPU 120, the bus 122, the ROM 124, and the RAM 126 substantially have the same functions as the CPU 120, the bus 122, the ROM 124, and the RAM 126 described above with reference to the video data recording device 110, the same numerals are given and descriptions thereof are not repeated. Also, the remote control I/F 216, the video data acquisition unit 230, the mask processing unit 240, and the video data output unit 242 of the video data playing device 200 having different configurations from those of the video data recording device 110 will be mainly described.

The remote control I/F 216 acquires and holds a command corresponding to a user input through an infrared ray communication with a remote controller 280. The CPU 120 reads such a command and performs a process corresponding to the command.

The video data acquisition unit 230 acquires a frame forming video data from the external recording medium 190. Also, the video data acquisition unit 230 acquires related information capable of specifying a partial image to be mask processed, from the external recording medium 190.

Although data encoding is not described herein, the data processing unit 132 of the video data recording device 110 may combine a frame with previous and next frames, encode the combined frames in a predetermined encoding method, such as M-JPEG, MPEG-2, or H.264, and transmit the encoded combined frames to the imaging recording I/F unit 136. Here, the video data acquisition unit 230 decodes the combined frames and transmits the decoded combined frames to the mask processing unit 240.

The mask processing unit 240 performs a mask process on the partial image of is the frame specified by the related information, and the video data output unit 242 outputs a result of the mask processing to the display 210.

Display of an image when the video data acquisition unit 230 reads the external recording medium 190 on which the related information and the frames are recorded, and the mask processing unit 240 performs the mask process based on the related information and outputs the frame to the display 210 will be described in comparison with a comparative example.

Figure 7A:
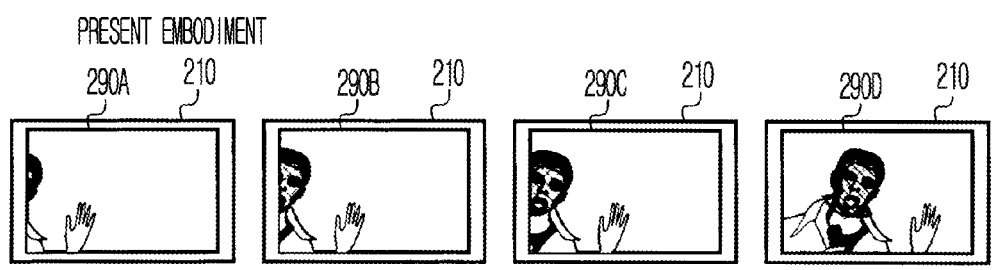
FIGS. 7A and 7B are diagrams for explaining a display example of an image on which a mask process is performed, according to the embodiment 1 of the present invention.
Figure 7B:
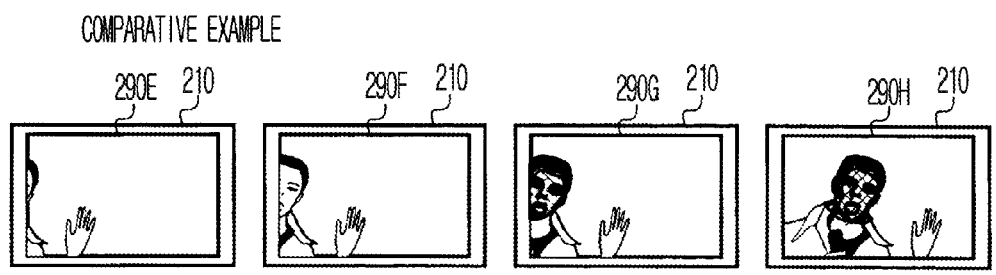
Figure 8A:
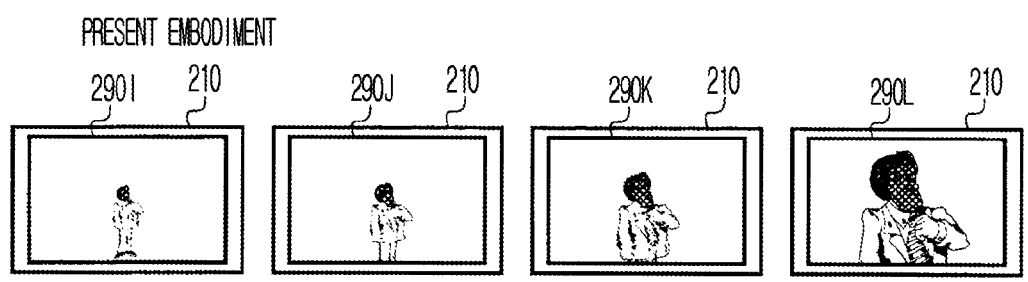
FIGS. 8A and 8B are diagrams for explaining a display example of an image on which the mask process is performed, according to the embodiment 1 of the present invention.
Figure 8B:
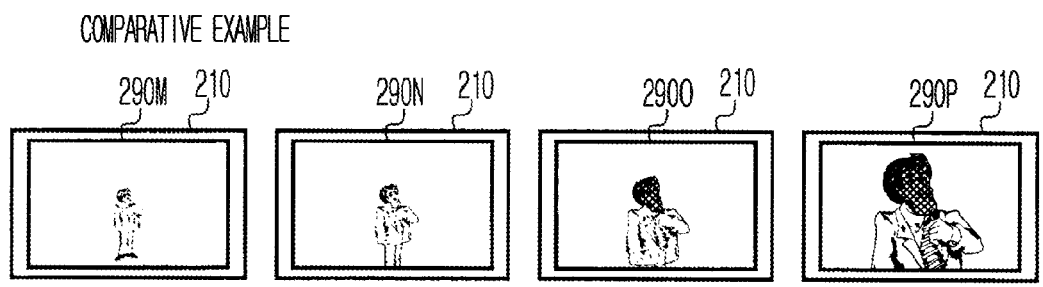
Figure 9A:
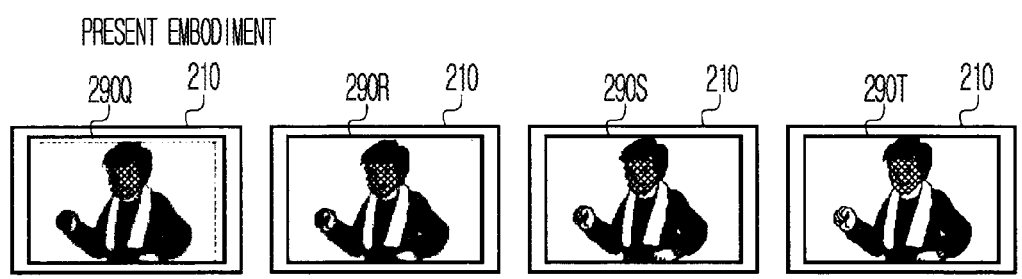
FIGS. 9A and 9B are diagrams for explaining a display example of an image on which the mask process is performed, according to the embodiment 1 of the present invention.
Figure 9B:
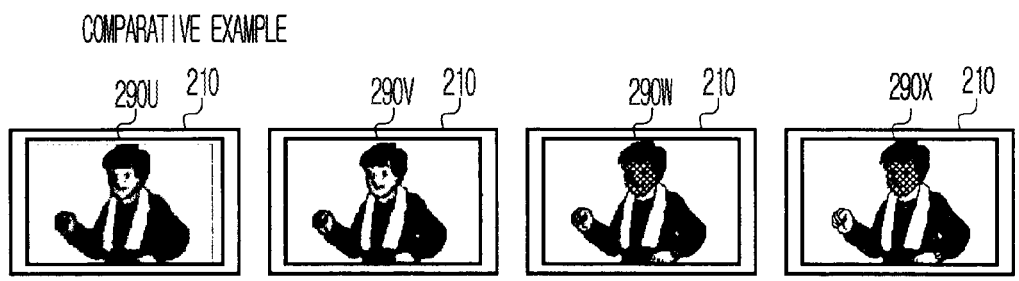

FIGS. 7, 8, and 9 are diagrams for explaining display examples of an image on which a mask process has been performed, according to the embodiment 1 of the present invention. Specifically, FIGS. 7A, 8A, and 9A are display examples of an image on which a mask process has been performed according to the present embodiment, and FIGS. 7B, 8B, and 9B are display examples of an image on which a conventional mask process has been performed as comparative examples. In FIGS. 7 through 9, for easy understanding, images 290A through 290D and 290E through 290H are arranged in FIG. 7, images 290I through 290L and 290M through 290P are arranged in FIG. 8, and images 290Q through 290T and 290U through 290X are arranged in FIG. 9, sequentially from the left of the drawings, wherein the images are extracted four times at an interval of about 1 second from video displayed on the display 210. It is assumed that the four images 290A through 290D of FIG. 7A and the four images 290E through 290H of FIG. 7B were respectively the same images until performing the mask process. The same applies for the four images 290I through 290L of FIG. 8A and the four images 290M through 290P of FIG. 8B, and the four images 290Q through 290T of FIG. 9A and the four images 290U through 290X of FIG. 9B. Also, in FIG. 9, since the image 290Q and the image 290U are out of focus (off the point), they have blurred outlines, and become images having clearer outlines as they are in focus as time of being displayed on the display 210 passes, like the image 290R and image 290V, image 290S and image 290W, and image 290T and image 290X.

As shown in FIG. 7B, when the conventional mask process is performed, the images 290E and 290F are not determined to be partial images indicating a face which are to be mask processed, and are displayed as they are, since the partial images showing the face does not completely appear in a screen. Accordingly, the person may be specified based on the partial image indicating the face included in the image 290E or 290F, and thus protection of privacy is not sufficient.

In the image 290G, the partial image showing the face sufficiently appears in the screen and a degree of similarity with reference information is obtained. Thus, the partial image showing the mask processed face is finally shown on and after the image 290G. On the images after that, for example image 290H, the mask process is continuously performed by tracking and detecting the partial image showing the face.

According to the present embodiment with respect to the above, as shown in FIG. 7A, the mask process is performed on the images 290A and 290B, even though an image indicating a face does not completely appear in a screen. As described above, the video data recording device 110 first holds the frame generated by the imaging unit 130 in the video buffer 134, and after it is determined that a partial image showing a face in the image 290C is a partial image to be mask processed, tracks back to the images 290A and 290B based on the frame held in the video buffer 134 to extract partial information capable of specifying the partial image showing the face. This is because the mask processing unit 240 of the video data playing device 200 performs the mask process on the partial image based on the related information related to such partial information.

The present embodiment is not limited to a case where the partial image showing the face is out of the screen, and may be applied to a case where the partial image showing the face, which is initially displayed on the screen, is too small and is thus gradually enlarged as shown in FIG. 8, or a case where the partial image showing the face is out of focus and is thus gradually focused as shown in FIG. 9.

As shown in FIG. 8B, according to the conventional mask process, the partial images showing the face in images 290M and 290N are not determined to be the partial images to be mask processed since they are too small, and thus are displayed as they are.

However, according to the present embodiment, as shown in FIG. 8A, after it is determined that the partial image showing the face in the image 290K is the partial image to be mask processed, the partial information may be retroactively extracted from the images 290I and 290J held in the video buffer 134. The mask processing unit 240 performs the mask process based on the related information related to the extracted partial information. Accordingly, it is possible to perform the mask process even when the partial image does not completely appear in the screen.

Similarly, in FIG. 9B, the images 290U and 290V are not determined to be the partial images to be mask processed since the partial images showing the face are out of focus, and thus are displayed as they are.

However, according to the present embodiment, like FIGS. 7A and 8A, after it is determined that the partial image showing the face on the image 290S after being focused is the partial image to be mask processed, the partial information may be retroactively extracted from the images 290Q and 290R held in the video buffer 134. The mask processing unit 240 performs the mask process based on related information related to the partial information. Accordingly, it is possible to perform the mask process even when the partial image does not completely appear in the screen.

As described above, the video data and the related information capable of specifying the partial image constituting the mask target are recorded on the external recording medium 190. Accordingly, since the video data playing device 200 can immediately perform the mask process from a point of time when at least a part of the mask target appears on the screen while playing the external recording medium 190, it is possible to sufficiently protect privacy even before the mask target completely appears in the screen.

Also, since the partial information capable of specifying the partial image of the mask target is already related to the frame in the video data, the video data playing device 200 does not require a process of deriving the mask target, and thus a privacy protected frame may be output via a lower load process. Also, since the mask process is not performed on the video data itself in the external recording medium 190, the user may output the video data after determining execution or non-execution of the mask process while the external recording medium 190 is read and played by the video data playing device 200.

(Video Data Recording Method)

FIG. 10 is a flowchart showing a flow of processes of a video data recording method according to the embodiment 1 of the present invention. The processes shown in the flowchart are performed for each frame.

When a user starts imaging (YES in S300), the imaging unit 130 generates a frame, for example, a Kth frame (wherein K is a predetermined integer used for description) from the imaging start, in S302, and the similarity determining unit 172 compares an image of the Kth frame with reference information recorded in the reference information storage unit 150 in S304 to derive similarity degree between partial information indicating a partial image included in the frame and the reference information in S306.

Also, the similarity determining unit 172 determines whether the derived similarity degree exceeds the first predetermined threshold value in S308. If the similarity degree exceeds the first predetermined threshold value (YES in S308), the similarity determining unit 172 holds the partial information in the partial information holding unit 152, in relation to the Kth frame, in S310.

Next, the relation determining unit 174 compares the partial information held in relation to the Kth frame with an image of a (K−1)th frame from a play start, which is held in the video buffer 134, and derives relation degree between the partial information held in relation to the Kth frame and partial information indicating a partial image, like a predetermined location and size included in the (K−1) frame, in S312.

Also, the relation determining unit 174 determines whether the derived relation degree exceeds the second predetermined threshold value in S314. If there is partial information in which the relation degree exceeds the second predetermined threshold value (YES in S314), the relation determining unit 174 extracts the partial information and holds the extracted partial information in the partial information holding unit 152, in relation to the (K−1)th frame, in S316.

Here, when there is a (K−2)th frame in the video buffer 134 (YES in S318), the relation determining unit 174 derives relation degree of partial information indicating a partial image, like a predetermined location and size included in the (K−2)th frame, using the partial information held in relation to the (K−1)th frame, whose relation degree is determined to exceed the second predetermined threshold value by the relation determining unit 174, instead of the partial information held in relation to the Kth frame.

In other words, the relation determining unit 174 sequentially reads the frames by subtracting 1 from K without changing an order of the frames, i.e., by sequentially changing the Kth frame to the (K−1)th frame, the (K−1)th frame to the (K−2)th frame, the (K−2)th frame to a (K−3)th frame and reading them, in S320, returns back to operation S312 to derive the relation degree with the partial information in the (K−1)th frame with respect to the partial information in relation to the Kth frame in S312, and repeats the above processes.

Such processes are performed until the relations degree derived from the partial information in relation to the (K−1)th frame are all equal to or below the second predetermined threshold value (NO in S314), or until the (K−2)th frame is not held in the video buffer 134 (No in S318).

When the similarity degree is equal to or below the first predetermined threshold value (NO in S308), when the relation with partial information having any location and any size is equal to or below the second predetermined threshold value (NO in S314), or when the (K−2)th frame is not held in the video buffer 134, the relation determining unit 174 ends the extraction of the partial information and the imaging recording I/F unit 136 records the video data and the related information related to the partial information on the external recording medium 190, in S322.

According to the video data recording method above-described, the imaging recording I/F unit 136 records the video data including the related information capable of specifying the partial image constituting the mask target on the external recording medium 190. Since the mask process is selectively performed while playing the video data, an actual mask process is not performed on the partial image in the video data recording method, and thus a processing load may be reduced.

(Video Data Playing Method)

Next, a video data playing method for playing the external recording medium 190 generated by the video data recording device 110 by using the video data playing device 200 will be described by using a flowchart.

Figure 11:
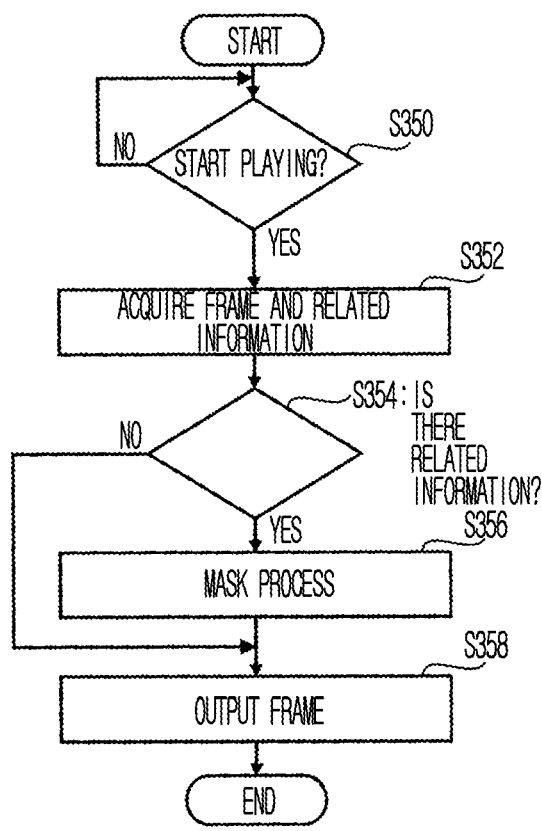
FIG. 11 is a flowchart showing a flow of processes of a video data playing method according to the embodiment 1 of the present invention.

FIG. 11 is a flowchart showing a flow of processes of a video data playing method according to the embodiment 1 of the present invention. In FIG. 11, when the user starts to play the external recording medium 190 (YES in S350), the video data acquisition unit 230 acquires the frames forming the video data and the related information capable of specifying the partial image constituting the mask target from the external recording medium 190, in S352.

The mask processing unit 240 determines whether the related information is in relation to the acquired frame in S354. If the related information is in relation (YES in S354), the mask processing unit 240 performs the mask process on the partial image specifiable by the related information in relation to the frame in S356, and the video data output unit 242 outputs the frame to the display 210 by frequently changing the frame into a video signal in S358.

According to the video data playing method, the mask process is performed by referring to the related information recorded on the external recording medium 190, and the video data is output.

As described in the present embodiment, since the extracting of the partial information indicating the mask target is performed while recording the video data and the mask process is performed while playing the video data, the load during the processes is dispersed, and thus the privacy protected video data is output with a lower load. Also, since the video data itself recorded in the external recording medium 190 has not been mask processed, the user may output the video data after determining execution or non-execution of the mask process.

(Embodiment 2)

When the video data recording device 110 and the video data playing device 200 according to the embodiment 1 are used, the extracted mask target is first recorded on the external recording medium 190 with the video data, and later mask process is performed and the mask processed video data are output to the display 210. In the embodiment 2, a video data playing device 380 having some functions of each of the video data recording device 110 and video data playing device 200, performing a mask process almost in real time on the video data acquired from the external recording medium 190 and outputting the mask processed video data, will be described.

(Video Data Playing Device 380)

Figure 12:
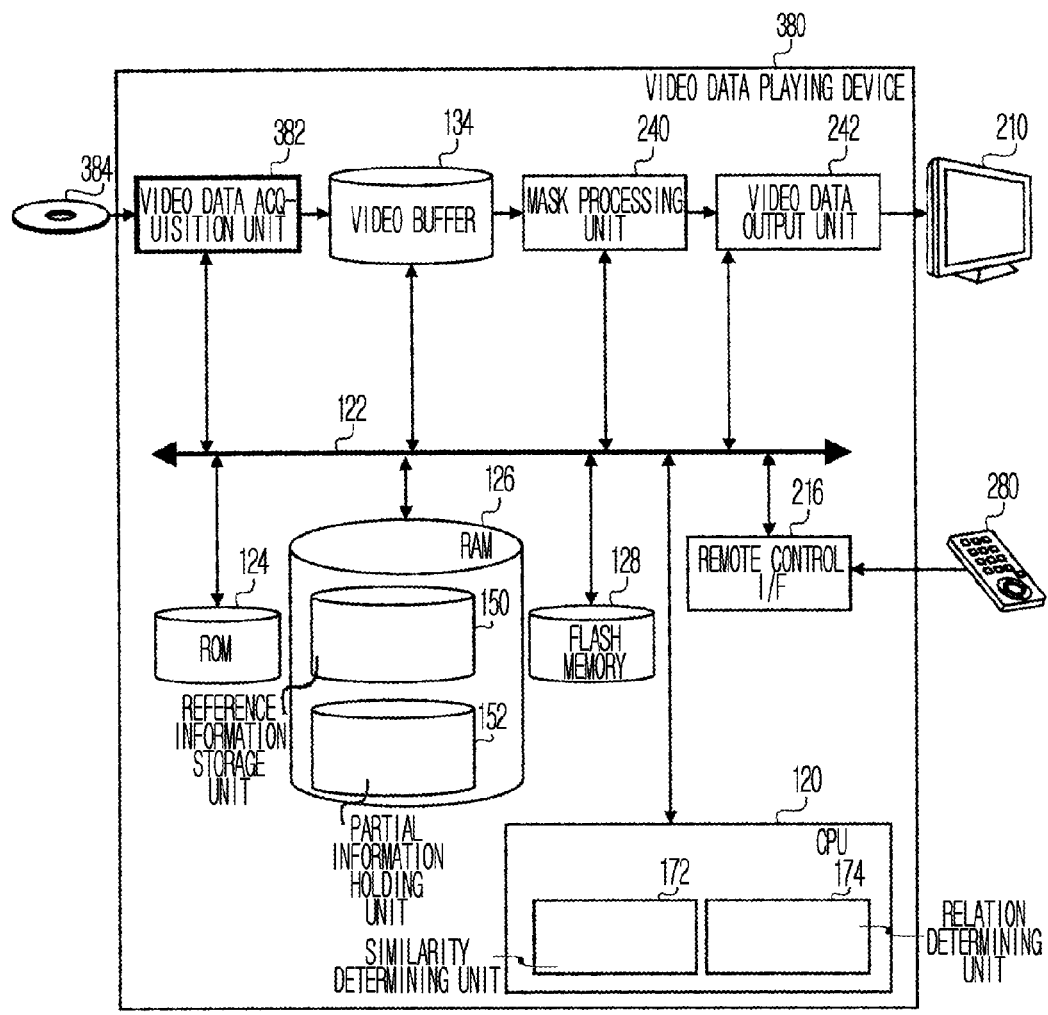
FIG. 12 is a functional block diagram showing a schematic configuration of a video data playing device according to an embodiment 2 of the present invention.

FIG. 12 is a functional block diagram showing a schematic hardware configuration of the video data playing device 380 according to the embodiment 2 of the present invention. The video data playing device 380 includes a CPU 120, a bus 122, a ROM 124, a RAM 126, a flash memory 128, a video data acquisition unit 382, a remote control I/F 216, a video buffer 134, a mask processing unit 240, and a video data output unit 242.

Since the CPU 120, the bus 122, the ROM 124, the RAM 126, the flash memory 128, the remote control I/F 216, the video buffer 134, the mask processing unit 240, and the video data output unit 242 substantially have the same functions as the CPU 120, the bus 122, the ROM 124, the RAM 126, the flash memory 128, the remote control I/F 216, the video buffer 134, the mask processing unit 240, and the video data output unit 242 described with reference to the video data recording device 110 and the video data playing device 200 according to the embodiment 1, the same numerals are given and descriptions thereof are not repeated. Here, the video data acquisition unit 382 in the video data playing device 380 will be mainly described since it has a different is configuration from the video data recording device 110 and the video data playing device 200.

The video data acquisition unit 382 acquires frames from an external recording medium 384 as a recording medium, on which video data (frames) is recorded. Related information recorded on the external recording medium 190 according to the embodiment 1 is not recorded on the external recording medium 384.

Also, the video data playing device 380 retroactively extracts partial information indicating a mask target from the frames held in the video buffer 134, the mask processing unit 240 performs the mask process, and the video data output unit 242 outputs the mask processed video data to the display 210.

Since the video data playing device 380 according to the present embodiment extracts the partial information capable of specifying the partial image constituting the mask target and compares the partial image with an image corresponding to the frame held in the video buffer 134, the partial information may be retroactively extracted from the frame held in the video buffer 134.

Also, the mask processing unit 240 performs the mask process on the partial image specifiable by the partial information, for example, immediately before output or at a predetermined timing while being held in the video buffer 134. Accordingly, the mask process may start from the frame including even a part of the mask target, and thus it is possible to sufficiently protect privacy even before the mask target completely appears in the screen.

(Video Data Playing Method)

Figure 13:
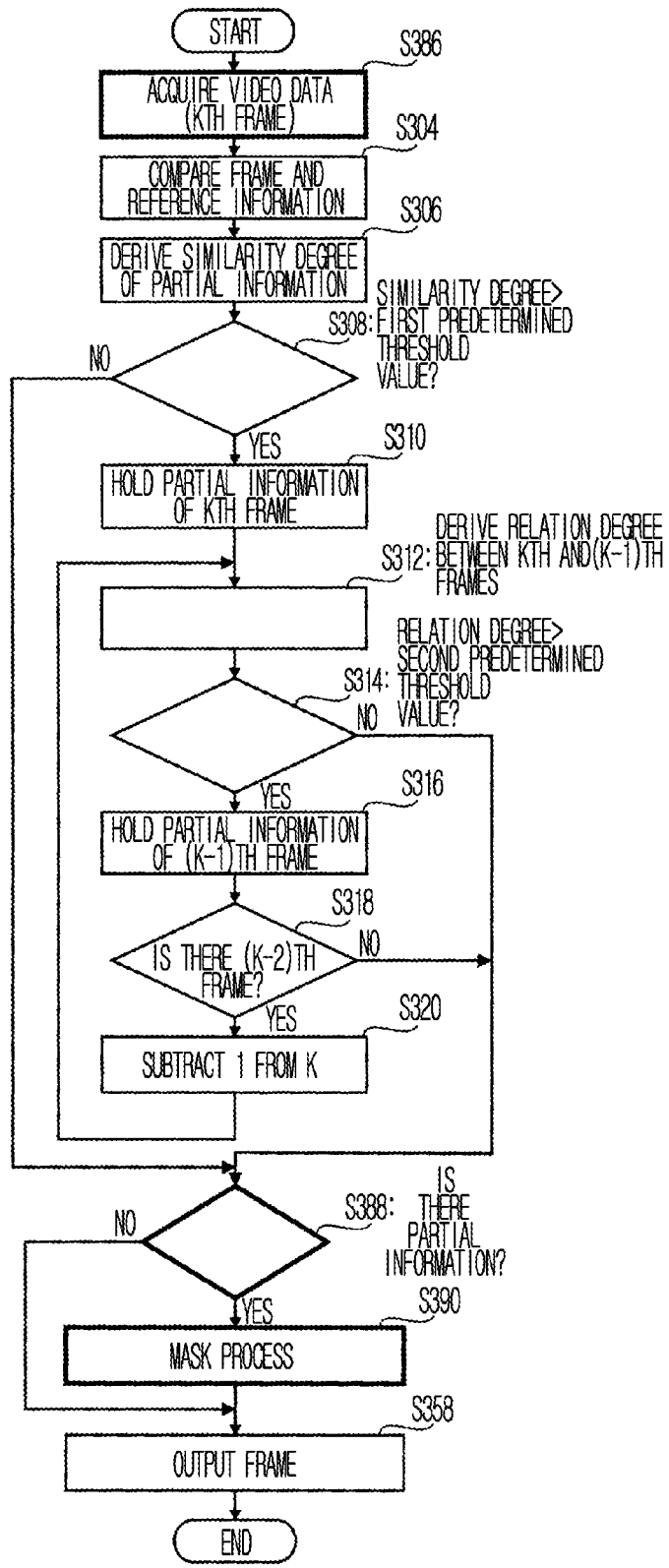
FIG. 13 is a flowchart showing a flow of processes of a video data playing method according to the embodiment 2 of the present invention.

FIG. 13 is a flowchart showing a flow of processes of a video data playing method according to the embodiment 2 of the present invention. The processes shown in the flowchart is performed for each frame.

The video data acquisition unit 382 acquires, for example, a Kth frame from a play start, from the external recording medium 384, in S386. After the frame is acquired, since an order from step S304 in which the frame output to the video buffer 134 and the reference information are compared, to step until the extraction of the partial information is ended (NOs in S308, S314 and S318) is identical to that in the video data playing method according to the embodiment 1 shown in FIG. 10, the same numerals are used and descriptions thereof are not repeated.

Also, when a frame the oldest in the video buffer 134 reaches the end of a memory region, the mask processing unit 240 determines whether the partial information in relation to the frame exists, in S388. If the partial information exists (YES in S388), the mask processing unit 240 performs the mask process on the partial image specifiable by the partial information in S390.

After performing the mask process on the partial image specifiable by the partial information, the video data output unit 242 outputs the frame to the display 210 by frequently changing the frame to a video signal in S358, like the process of the video data playing method shown in FIG. 11.

According to the video data playing method of the present embodiment, the frame is held in the video buffer 134, and the mask process is performed on the entire partial image specifiable by the partial information in relation to the frame. Accordingly, since the mask process is retroactively performed on the frame in the video buffer 134, it is possible to sufficiently protect privacy even before the mask target completely appears in the screen.

(Embodiment 3)

In the embodiment 1 and 2, the relation degree was derived via comparison between the images while extracting the partial information capable of specifying the partial image constituting the mask target. In the embodiment 3, a video data playing device 400, which, after holding video data in the video buffer 134, extracts and holds target information including feature points or features constituting a comparison target of reference information, and retroactively extracts a mask target via comparison between pieces of such target information, and a video data playing method using the video data playing device 400 will be described.

(Video Data Playing Device 400)

Figure 14:
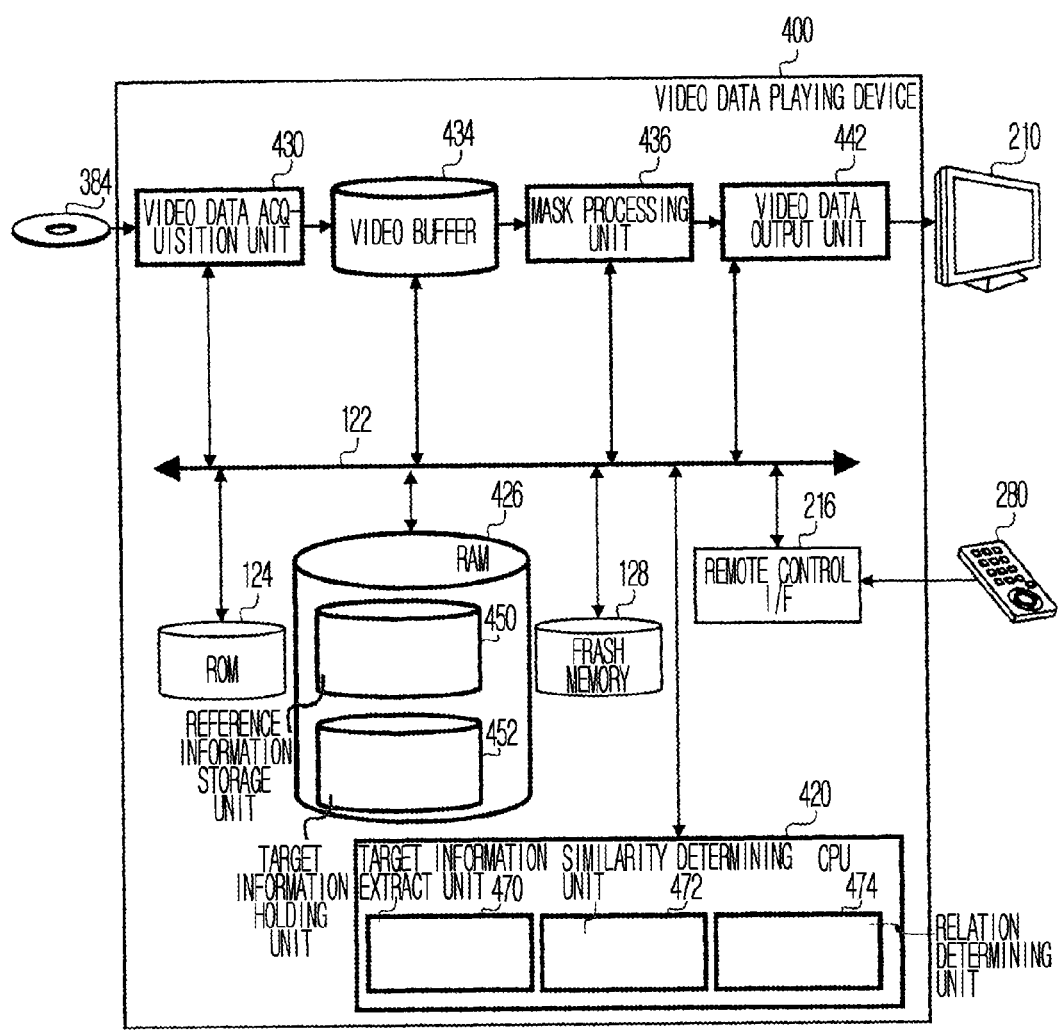
FIG. 14 is a functional block diagram showing a schematic configuration of a video data playing device according to an embodiment 3 of the present invention.

FIG. 14 is a functional block diagram showing a schematic hardware configuration of the video data playing device 400 according to an embodiment 3 of the present invention. The video data playing device 400 includes a CPU 420, a bus 122, a ROM 124, a RAM 426, a flash memory 128, a video data acquisition unit 430, a video buffer 434, a mask processing unit 436, a video data output unit 442, and a remote control I/F 216.

Since the bus 122, the ROM 124, the flash memory 128, and the remote control I/F 216 substantially have the same functions as the bus 122, the ROM 124, the flash memory 128, and the remote control I/F 216 described with reference to the video data recording device 110, the same numerals are given and descriptions thereof will not be repeated. Here, the CPU 420, the RAM 426, the video data acquisition unit 430, the video buffer 434, the mask processing unit 436, and the video data output unit 442 in the video data playing device 400 will be mainly described because they have different configurations from those in the video data recording device 110.

The CPU 420 manages the entire video data playing device 400 based on a program stored in the ROM 124. In detail, the CPU 420 controls the ROM 124, the RAM 426, the flash memory 128, the video data acquisition unit 430, the video buffer 434, the mask processing unit 436, the video data output unit 442, and the remote control I/F 216 via the bus 122. The RAM 426 stores variables used while executing the program.

The video data acquisition unit 430 acquires video data from the external recording medium 384 as a recording medium. The video data may be moving image data including a plurality of consecutive frames, or a plurality of consecutive still image data. In the following embodiment, the moving image data including the plurality of consecutive frames is described as an example of the video data. Here, a recording medium having a disc shape, such as a DVD, a Blu-ray disc, or the like, is used as the external recording medium 384, but any recording medium, such as a flash memory, an HDD, or the like, may be applied as the external recording medium 384.

The video buffer 434 temporarily holds the video data acquired by the video data acquisition unit 430, specifically, a frame corresponding to one screen. Also, the video buffer 434 functions as a shift register for shifting a past frame whenever the video data acquisition unit 430 acquires a frame. According to the present embodiment, for example, the video buffer 434 may hold video data having a bit rate of about 750 Mbps in which a frame having resolution of 1920×1080 pixels is transmitted at 30 frames/sec, with the amount of video data corresponding to a recording time of about 10 seconds.

When a mask flag indicating a mask target is assigned to target information in relation to the frame held in the video buffer 434 by a similarity determining unit 472 or a relation determining unit 474 which will be described later, the mask processing unit 436 performs a mask process on a partial image specifiable by the target information in relation to the frame.

The video data output unit 442 outputs the video data mask processed by the mask processing unit 436 to the display 210 by changing the video data to a video signal.

The RAM 426 may also function as a reference information storage unit 450 and a target information holding unit 452 in association with the CPU 420 and other elements.

The reference information storage unit 450 pre-stores reference information including predetermined features. As described above, such reference information is held in the flash memory 128 instead of the RAM 426, when power supply is cut off. Here, the predetermined features include, for example, when the reference information is information indicating a face, indicator values, such as an occupied area of a reference face image in a screen, feature points of the reference face image, a distance between the feature points, a size of a feature part, an outline and luminance of the reference face image, a skin color, a hair color, an amount of hair, etc. Also, aside from the information indicating the face, the reference information also includes information from which the features are extracted by using any conventional technology, such as information indicating a vehicle, information indicating a building, information indicating a letter, or the like.

The target information holding unit 452 holds target information extracted from newest frame (video data) by a target information extract unit 470 that will be described later, in relation to the frame (a frame corresponding to an extraction source of a target information). Besides the predetermined features, such target information also includes coordinate information indicating a location and size in a screen of a partial image itself specifiable by the target information, and the coordinate information may specify the partial image included in the image indicated by the frame.

The CPU 420 may also function as the target information extract unit 470, the similarity determining unit 472, and the relation determining unit 474, in association with the RAM 426 and other elements.

The target information extract unit 470 extracts the target information constituting the comparison target of the reference information from the frame acquired by the video data acquisition unit 430, and holds the target information in the target information holding unit 452 in relation to the frame.

The target information extract unit 470 also refers to an area other than the partial image estimated to be the face, for example, whether an image of a neck, body, a lower body, or the like can be detected near the partial image estimated to be the face, whether a height of a detected person is extremely too high or too short compared to a height of another person in the screen, or the like. The target information extract unit 470 extracts the target information by evaluating and determining the area other than the partial image estimated to be the face in overall, for example, by giving weighting to an evaluation value of the skin color or the hair color and, recognizing as the face.

The similarity determining unit 472 compares indicator value of the features of the newest target information held in the target information holding unit 452 with that of the features in the reference information stored in the reference information storage unit 450, and derives similarity degree by evaluating the degree of similarity of both in overall.

The similarity determining unit 472 determines that both are similar when the similarity degree between the target information and the reference information exceeds the first predetermined threshold value, and assigns the mask flag, which indicates that the mask process is required on the partial image specifiable by the target information, to the target information. Accordingly, the target information is held in the target information holding unit 452, while being assigned with the mask flag.

Further, in some cases, features may not be extracted only by the determination of similarity. One example of the cases is that, among the image which corresponds to the frame pre-recorded in the video buffer 434 and is determined not to include the partial image whose similarity exceeds the first predetermined threshold value, since the face does not sufficiently appear on the screen and thus features may not be extracted from the image despite that the face is the same as a face of the reference information, partial information whose similarity degree is derived as low may be included.

In order to determine that the such information is the mask target, the relation determining unit 474 derives relation degree with each piece of target information of other frames, which are acquired before a frame determined whether similar or not and held in the target information holding unit 452, with respect to the target information determined to be similar, since the similarity degree exceeds the first predetermined threshold value, from among the target information extracted from the frame determined whether similar or not by the similarity determining unit 472 and held in the target information holding unit 452.

As described above, it is highly possible that the same partial information is is imaged at the same coordinate in the same size between adjacent frames of the video data, unless the subject moves at a quite high rate.

Thus, the relation determining unit 474 derives relation degree by evaluating and determining in overall whether both are related while not only considering the features of the target information, but also considering frame correlation, i.e., a distance between a coordinate indicated by the target information, in which the similarity exceeds the first predetermined threshold value, and a coordinate indicated by target information of each previous frame, and a size of the partial image specifiable by the target information.

Next, the relation determining unit 474 determines that one or more pieces of target information in which the derived relation degree exceeds the second predetermined threshold value, to be related, and assigns the mask flag to all related target information.

As described above, the mask process may be performed by suitably determining whether the mask process is required based on numeral comparison, by using structures for numerically expressing the degrees of similarity and relation respectively as the similarity degree and the relation degree.

Figure 15A:
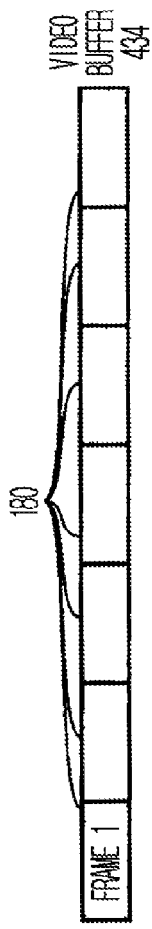
FIGS. 15A through 15E are diagrams for explaining processes of a similarity determining unit according to the embodiment 3 of the present invention.
Figure 15B:
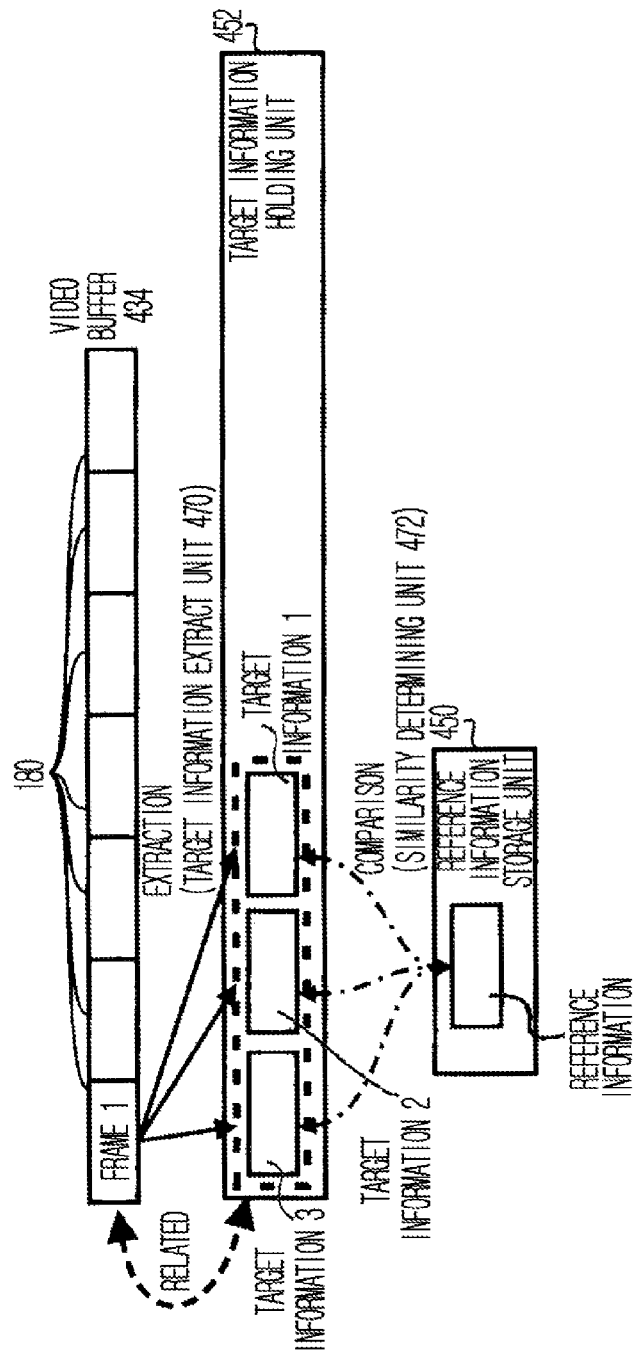
Figure 15C:
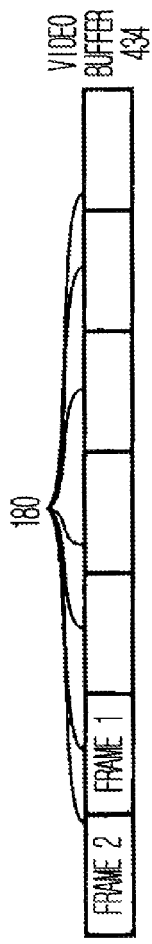
Figure 15D:
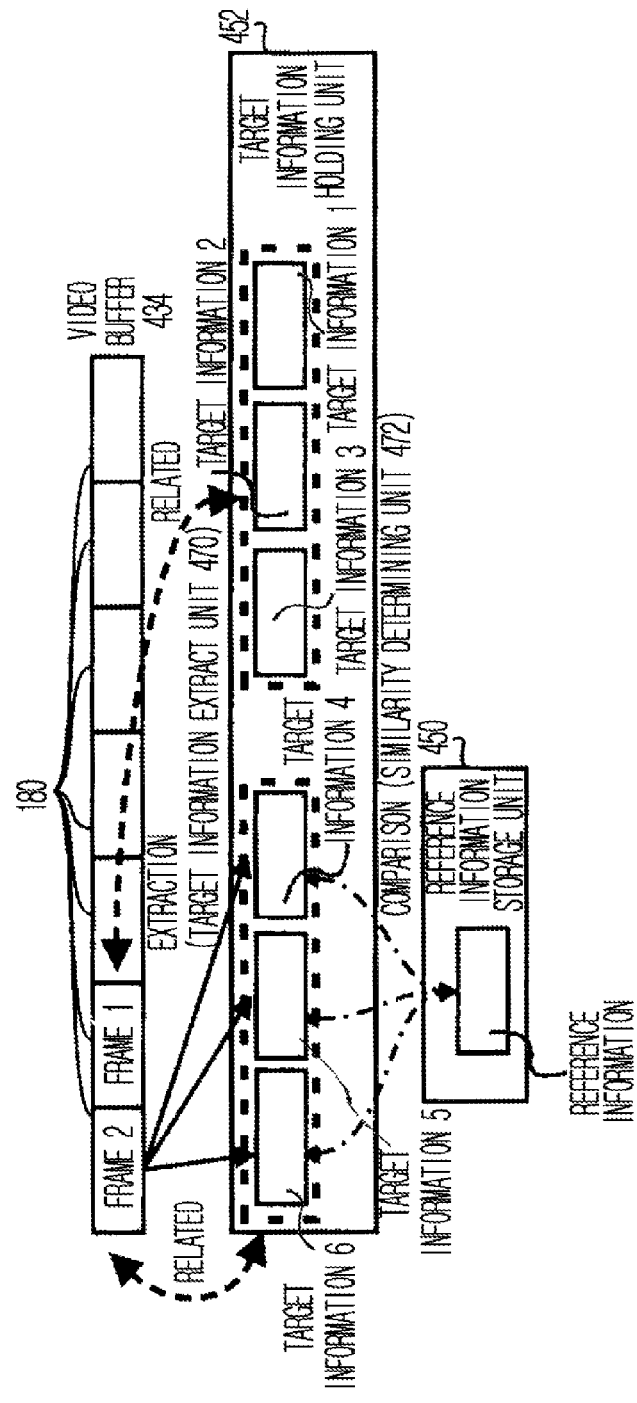
Figure 15E:
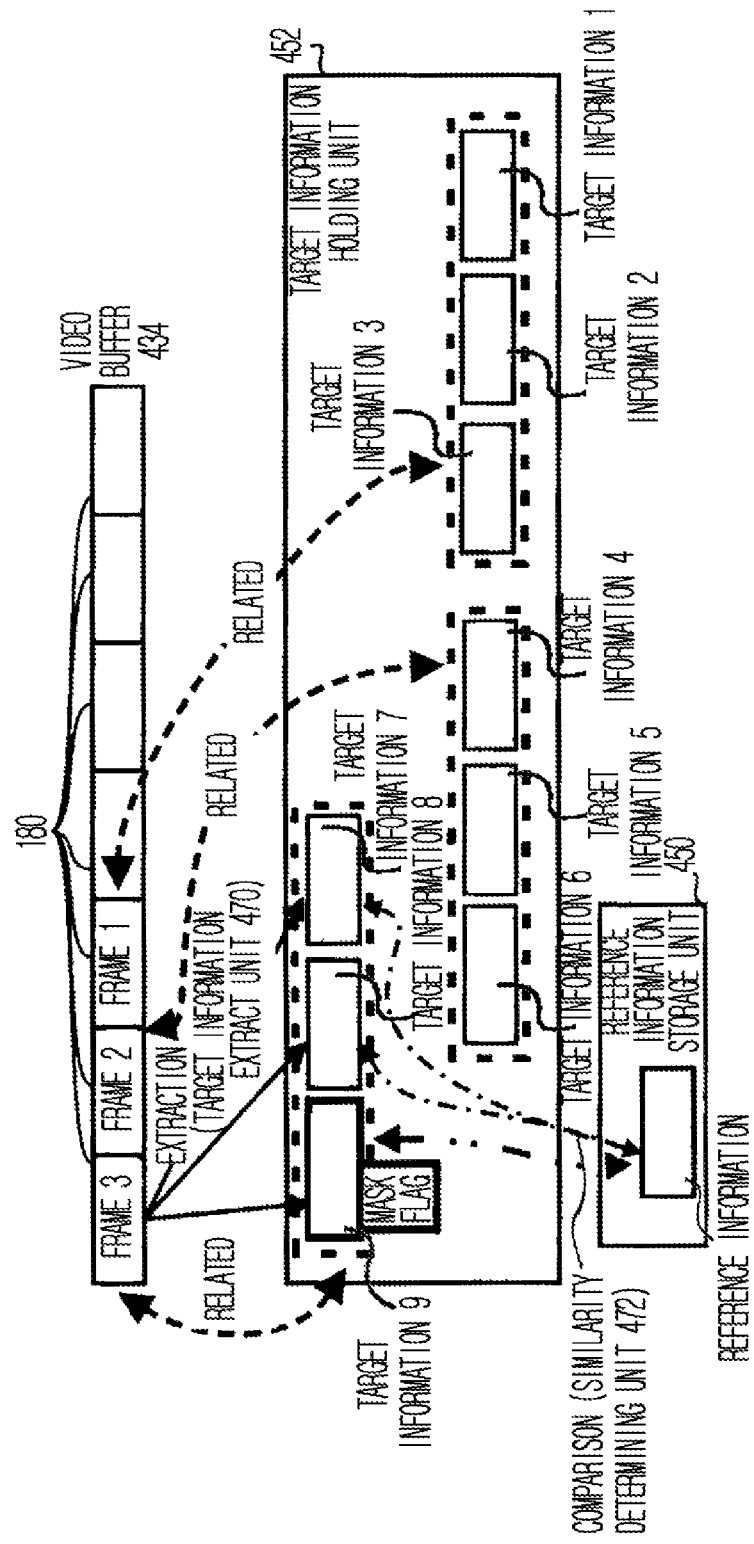
Figure 16A:
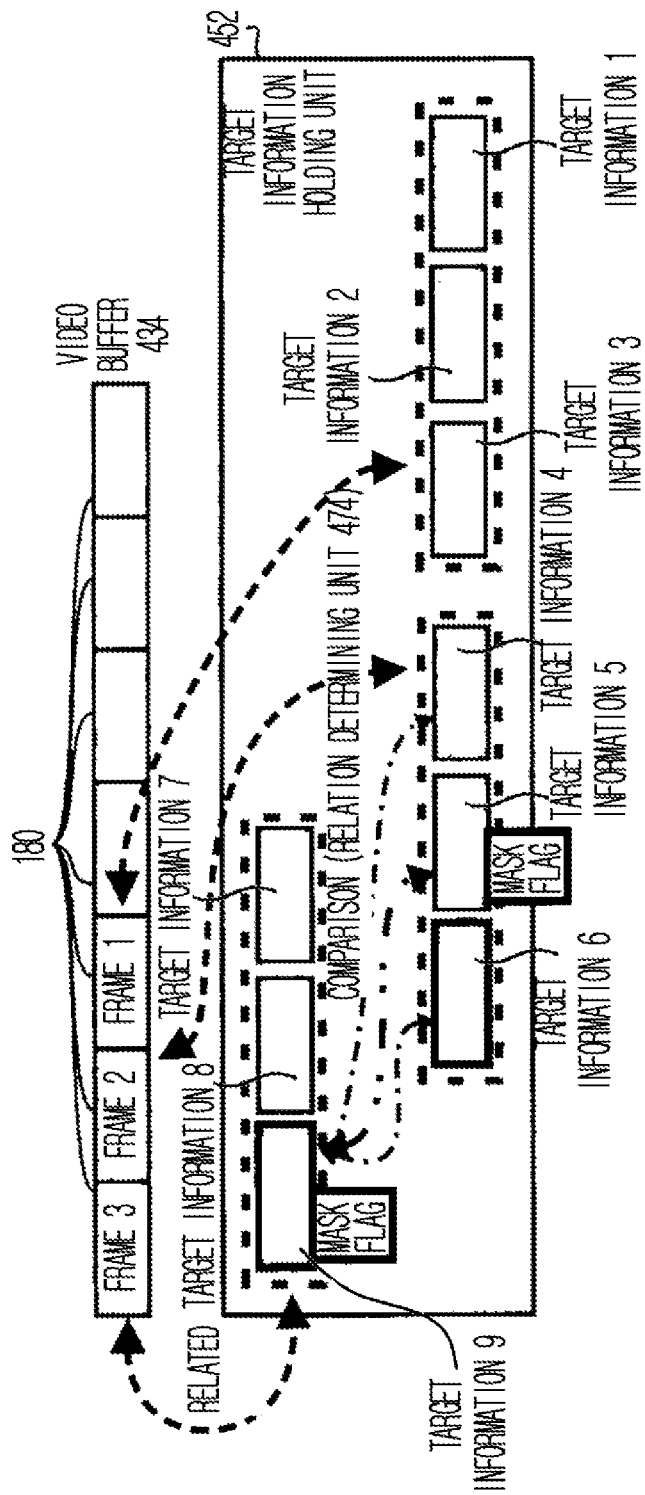
FIGS. 16A through 16C are diagrams for explaining processes of a relation determining unit according to the embodiment 3 of the present invention.
Figure 16B:
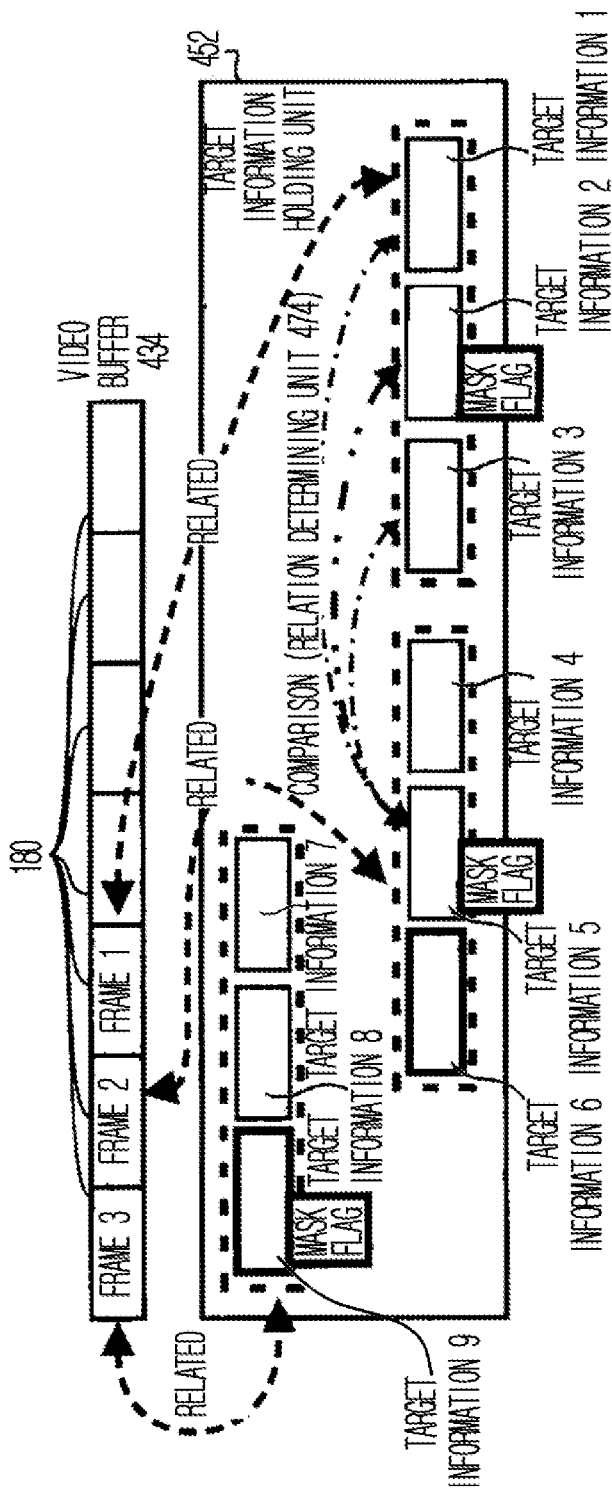
Figure 16C:
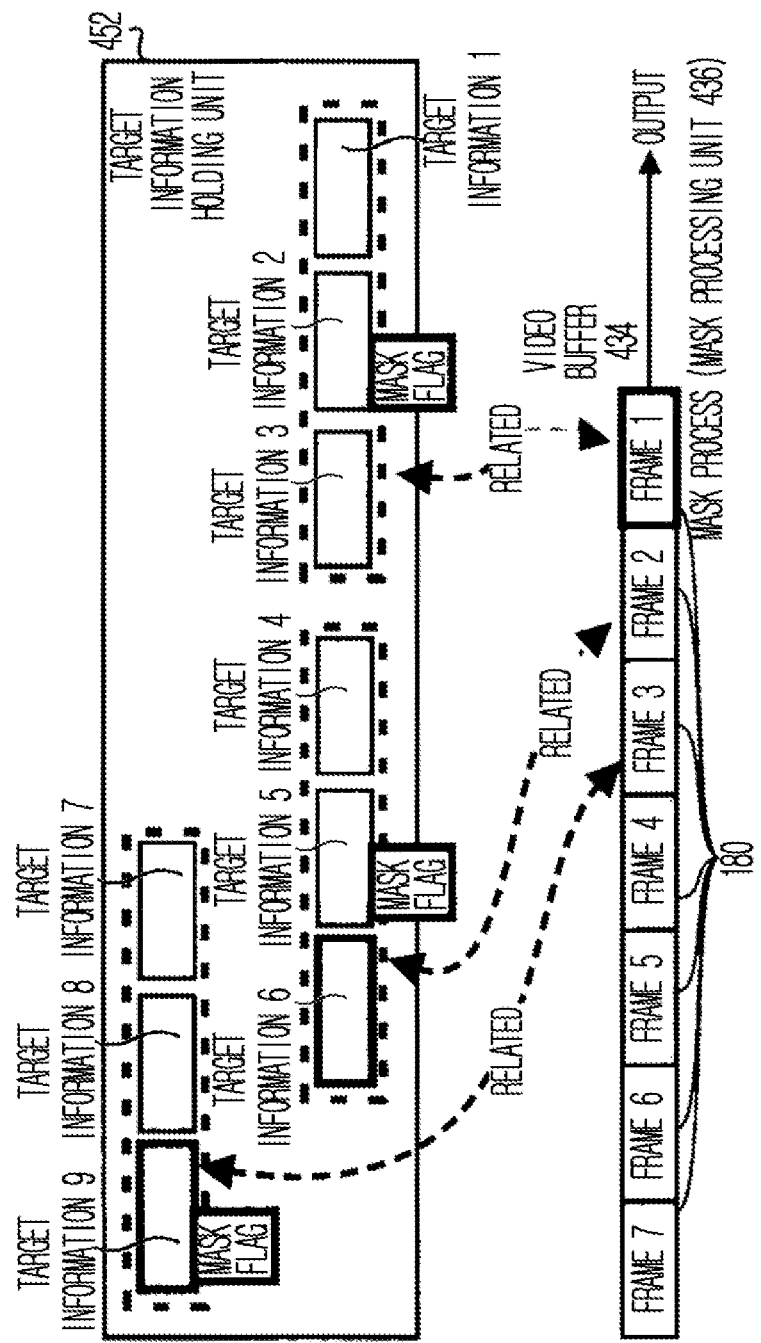

FIGS. 15A through 15E are diagrams for explaining processes of the similarity determining unit 472 according to the embodiment 3 of the present invention, and FIGS. 16A through 16C are diagrams for explaining processes of the relation determining unit 474 according to the embodiment 3 of the present invention. Here, FIGS. 15 and 16 show a series of consecutive processes. In FIGS. 15 and 16, the video buffer 434 is divided into memory regions 180 each for storing one frame of the video data, like FIGS. 4 and 5, so as to describe a moving process of the frames in a time series. An acquired frame is input to the left end memory region 180, shifted to the right along a generation timing of the frame, and is output from the right end memory region 180. Here, the number of memory regions 180 is 7 for convenience of description.

In FIG. 15A, the video buffer 434 holds the frame 1 constituting the initial frame of the video data initially acquired by the video data acquisition unit 430.

Then, as shown in FIG. 15B, the target information extract unit 470 holds the target information extracted from the frame 1 held in the video buffer 434 (here, for example, it is assumed that three pieces of target information, i.e., target information 1, target information 2, and target information 3 are extracted) in the target information holding unit 452, in relation to the frame 1 (such relation is shown in two arrows of a broken line and broken line rectangles).

The similarity determining unit 472 derives similarity degree of the reference information stored in the reference information storage unit 450 with each of the target information 1, the target information 2, and the target information 3 (combinations for driving the similarity are shown in two arrows of one-dot dashed lines). Here, it is determined not to be similar since all of the derived similarity degree does not exceed the first predetermined threshold value.

Next, as shown in FIG. 15C, the frame 1 is once shifted to the right memory region 180, and thus the frame 2 constituting a next frame acquired by the video data acquisition unit 430 is newly held.

Then, as shown in FIG. 15D, like FIG. 15B, the target information extract unit 470 holds target information 4, target information 5, and target information 6 extracted from the frame 2 in the target information holding unit 452, in relation to the frame 2. Also, the similarity determining unit 472 derives similarity degree between the reference information stored in the reference information storage unit 450 and each of the target information 4, the target information 5, and the target information 6. Here, it is also assumed that the reference information was not similar to each of the target information 4, the target information 5, and the target information 6.

Next, similarly in the acquired frame 3, target information 7, target information 8, and target information 9 are held in the target information holding unit 452, in relation to the frame 3, and similarity degree is derived. As shown in a combination of two arrows of a two-dot dashed line in FIG. 15E, it is determined that the reference information and the target information 9 are similar. The similarity determining unit 472 assigns the mask flag to the target information 9.

When it is determined that the target information 9 is similar to the reference information in FIG. 15E, the relation determining unit 474 derives relation degree with each target information held in the target information holding unit 452 in relation to frames (frame 1 and frame 2) acquired before the frame 3 that is determined whether similar or not by the similarity determining unit 472, with respect to the target information 9, as shown in FIG. 16A.

Here, the relation determining unit 474 derives relation degree from a newer frame (a frame of the memory region 180 disposed more left in the video buffer 434 of FIG. 16) from among other frames, i.e., from the target information 4, the target information 5, and the target information 6 in relation to the frame 2. Also, the relation determining unit 474 determines that the target information in which the derived relation degree exceeds the second predetermined threshold value, is related to the target information 9 (the combination is shown in two arrows of a two-dot dashed line in FIG. 16A). For example, when it is determined that the target information 5 is related to the target information 9 as shown in FIG. 16A, the relation determining unit 474 assigns the mask flag to the target information 5.

Also, the relation determining unit 474 derives relation degree with a next new frame with respect to the target information 5 determined to be related, here, relation degree of the target information 1, target information 2, and the target information 3 in relation to the frame 1, and the target information 5. When it is determined that the target information 2 is related to the target information 5, the relation determining unit 474 assigns the mask flag to the target information 2 as shown in FIG. 16B.

Also, in FIG. 16A, when the relation determining unit 474 determines that no target information in relation to the frame 2 is related, i.e., when there is no target information related between the frame 2 and the frame 3, the relation determining unit 474 stops assigning of the mask flag, and stops comparison with the target information acquired from the older frame than frame 2 (the frame of the memory region 180 located more right than frame 2 in the video buffer 434 of FIG. 15).

When, by continuously shifting the oldest frame (the frame 1 in FIG. 16) in the video buffer 434, the oldest frame reach the last memory region 180, the video data output unit 442 sequentially outputs from the frame 1 to the display 210. Immediately before the output, the mask processing unit 436 determines whether the target information held in the target information holding unit 452 in relation to the output frame is assigned with the mask flag, and if the mask flag is assigned, performs the mask process on a partial image specifiable by the target information of the frame.

In a point of view of FIG. 16C, since the mask flag is assigned to the target information 2, the mask processing unit 436 performs the mask process on a partial image specifiable by the target information 2 in relation to the frame 1. The video data output unit 442 outputs the mask processed frame to the display 210 by frequently changing the mask processed frame to a video signal.

As such, even if the mask flags are assigned to a plurality of pieces of target information in relation to the frame in different timings, an actual mask process can be finished at once by using a configuration in which mask processing is performed only the output frames immediately before output from the video buffer 434, and thus a processing load of the mask process may be reduced.

Also, a timing for performing the mask process is not limited to immediately before outputting the frame to the display 210, but the mask process may be performed with respect to the frame held in the video buffer 434 and related to the target information, instead of assigning the mask flag to the target information whenever the target information to be mask processed appears.

Also, in the target information determined to be similar by the similarity determining unit 472, the relation determining unit 474 may derive relation degree with, not only target information in relation to another frame acquired before extracting the target information determined to be similar described above, but also target information in relation to a frame extracted afterward, and assign the mask flag.

In other words, when the target information that is determined to be similar by the similarity determining unit 472 and is assigned with the mask flag is shifted, the relation determining unit 474 determines relation degree between target information assigned with the mask flag and is in relation to a shifted previous frame, and target information in relation to the frame in which determination of similarity is performed, after finishing, once, determination process of the target information in relation to the frame in which determination of similarity is performed by the similarity determining unit 472. For example, the relation determining unit 474 also determines relation in an inverse direction (a direction to a newer frame). Also, when the relation degree exceeds the second predetermined threshold value, the relation determining unit 474 assigns the mask flag to the target information in relation to the frame in which determination of similarity is performed.

The relation determining unit 474 derives the relation by comparing the target information in which the similarity degree exceeds the first predetermined threshold value, with the target information held in the target information extract unit 470, but the present invention is not limited thereto. The relation determining unit 474 may compare not the target information (features), but the image itself based on the frame before being held in the video buffer 434, with the partial image specifiable by the target information in which the similarity degree exceeds the first predetermined threshold value. Here, the target information is only used to derive the similarity degree by the similarity determining unit 472.

In such comparison, when the partial image in which the relation degree with the partial image specifiable by the target information exceeds the second predetermined threshold value, was included among the image based on the frame, the relation determining unit 474 compares the partial image that exceeds the second predetermined threshold value with an image based on more previous frame.

Also, the relation determining unit 474 may assign the mask flag by using the target information from the frame determined whether similarity or not by the similarity determining unit 472 to the frame including the target information in which the relation degree exceeds the second predetermined threshold value, and assign the mask flag by comparing, from the frame that does not include the target information, the partial image in which the relation degree exceeds the second predetermined threshold value, and the image based on the more previous frame.

In such comparison between the images of the frames, in addition to comparing the target information, more detailed pixel units may be compared by limiting around a coordinate that may be the same target as the target information in which the similarity degree exceeds the first predetermined threshold value, by using color information, motion vector information used in H.264 or the like, or the like. According to such a configuration, the mask process may be performed by relating the video data including information that may not be recognized as the extraction target of the target information, for example information indicating such as a head, an ear, or the like, to the target information exceeding the first predetermined threshold value.

By using the video data playing device 400 as described above, the frame acquired by the video data acquisition unit 430 is held in the video buffer 434, and the mask process is performed on the partial image specifiable by the target information assigned with the mask flag, for example, immediately before output. Since the display examples of the image on which the mask process has been performed are already described with reference to FIGS. 7, 8, and 9, and thus descriptions about the display examples are omitted herein. As such, in the video data playing device 400, the mask process can start from the video data including even a part of the mask target, and thus it is possible to sufficiently protect privacy even before the mask target completely appears in the screen.

Figure 17:
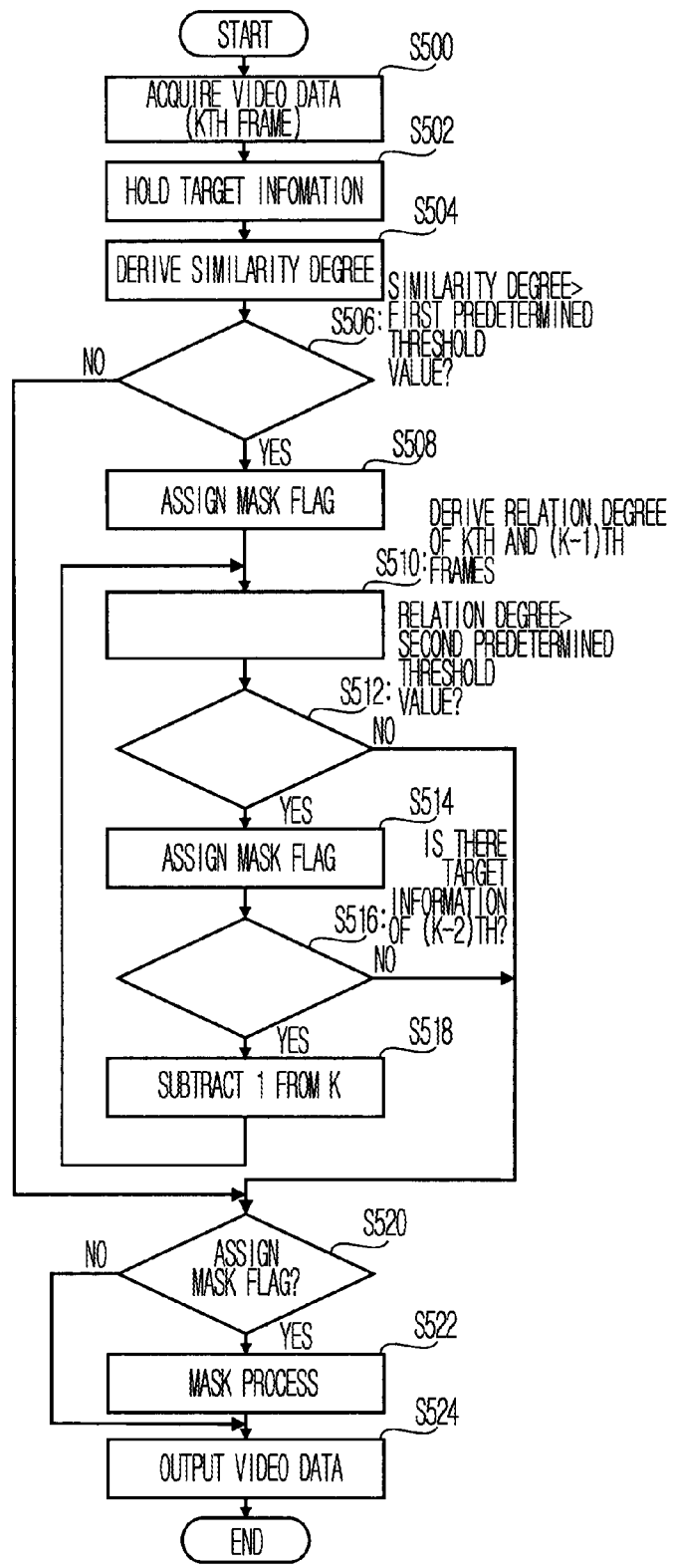
FIG. 17 is a flowchart showing a flow of processes of a video data playing method according to the embodiment 3 of the present invention.

FIG. 17 is a flowchart showing a flow of processes of a video data playing method according to the embodiment 3 of the present invention. The processes shown in the flowchart are performed for each frame.

When the video data acquisition unit 430 acquires a frame, for example, the Kth frame from a play start (K is a predetermined integer used for description), in S500, the target information extract unit 470 holds the target information extracted from the Kth frame in the target information holding unit 452, in relation to the frame in S502, and the similarity determining unit 472 derives the similarity degree between the target information and the reference information stored in the reference information storage unit 450 in S504.

Also, the similarity determining unit 472 determines whether the derived similarity degree exceeds the first predetermined threshold value in S506, and if the similarity degree exceeds the first predetermined threshold value (YES in S506), the similarity determining unit 472 assigns the mask flag to the target information in relation to the Kth frame, in S508. Next, the relation determining unit 474 derives relation degree between the target information, which is in relation to the Kth frame and assigned with the mask flag, and the target information, which is held in the target information holding unit 452 and in relation to the (K−1)th frame from the play start, in S510.

Also, the relation determining unit 474 determines whether the derived relation degree exceeds the second predetermined threshold value in S512, and if the relation degree exceeds the second predetermined threshold value (YES in S512), assigns the mask flag to the target information in relation to the (K−1)th frame in S514.

Here, when there is also the target information in relation to the (K−2)th frame (YES in S516), the relation determining unit 474 derives the relation degree of the target information in relation to the (K−2)th frame by using the target information in relation to the (K−1)th frame in which the relation degree is determined to exceed the second predetermined threshold value by the relation determining unit 474, instead of the target information in relation to the Kth frame.

In other words, the frames are sequentially read by subtracting 1 from K without changing an order of the frames, i.e., by changing the Kth frame to the (K−1)th frame, the (K−1)th frame to the (K−2)th frame, the (K−2)th frame to a (K−3)th frame, and sequentially reading them in S518, returns back to operation S510, and the relation determining unit 474 derives the relation degree with the target information in relation to is the (K−1)th frame with respect to the target information in relation to the Kth frame assigned with the mask flag, in S510, and the above processes are repeated.

Such processes are performed until all relation degrees derived with respect to the target information in relation to the (K−1)th frame are equal to or below the second predetermined threshold value (NO in S512), or until there is no target information in relation to the (K−2)th frame (NO in S516).

The assigning of the mask flag is ended when the similarity degree is equal to or below the first predetermined threshold value (NO in S506), when all the relation degree with the target information is equal to or below the second predetermined threshold value (NO in S512), or when there is no target information in relation to one previous frame (NO in S516). Also, when the oldest frame in the video buffer 434 reaches the end of the memory region 180, the mask processing unit 436 determines whether the mask flag is assigned to each piece of target information of the frame in S520. If the mask flag is assigned (YES in S520), the mask processing unit 436 performs the mask process on the partial image specifiable by the target information in relation to the frame in S522, and the video data output unit 442 outputs the frame to the display 210 by frequently changing the frame to a video signal in S524.

According to the present embodiment, the frame is held in the video buffer 434, and the mask process is performed on the partial image specifiable by the target information included in the held frame and assigned with the mask flag, for example, immediately before output. Accordingly, since the mask process can start from the video data including even the part of the mask target, it is possible to sufficiently protect privacy even before the mask target completely appears in the screen.

(Embodiment 4: System 600 for Recording and Playing Video Data)

In the video data playing device 400 according to the embodiment 3, the frame acquired by the video data acquisition unit 430 is temporarily held in the video buffer 434, and target information to be mask processed is retroactively extracted and is mask processed. According to the embodiment 4, a video data recording device 610 records a frame as it is in an external recording medium, and records related information related to target information in which mask flag is assigned in a timing different from a recording timing of a frame in relation to target information, in the external recording medium. Also, a video data playing device 700 plays while performing a mask process on the frame held in relation to the target information the mask flag assigned by the video data recording device 610. Hereinafter, the system 600 distinctive in the embodiment 4 will be described, and the video data recording device 610 and the video data playing device 700 will be describe by using block diagrams.

Figure 18:
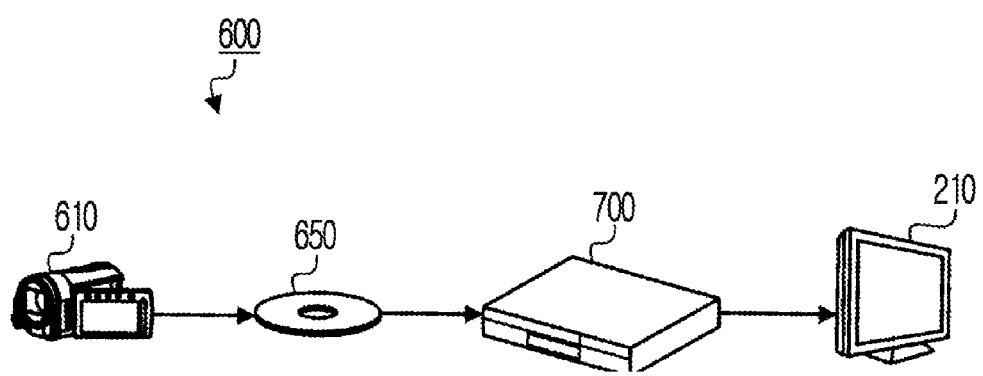
FIG. 18 is a diagram for explaining a schematic connection of a system for recording and playing video data, according to an embodiment 4 of the present invention.

FIG. 18 is a diagram for explaining a schematic connection of the system 600 for recording and playing video data, according to the embodiment 4 of the present invention.

As shown in FIG. 18, the system 600 includes the video data recording device 610, an external recording medium 650, the video data playing device 700, and the display 210.

The video data recording device 610 records a frame acquired by imaging on the external recording medium 650 as a recording medium. Here, the video data recording device 610 also records related information included in the target information assigned with the mask flag, in relation to the frame, at a little later timing. Also, the video data playing device 700 plays the external recording medium 650 recorded by the video data recording device 610 while performing the mask process, by referring to the related information, and outputs to the display 210. The related information is information including coordinate information indicating a location and size in a screen from among image of one screen corresponding to the frame, like the embodiment 1.

(Video Data Recording Device 610)

Figure 19:
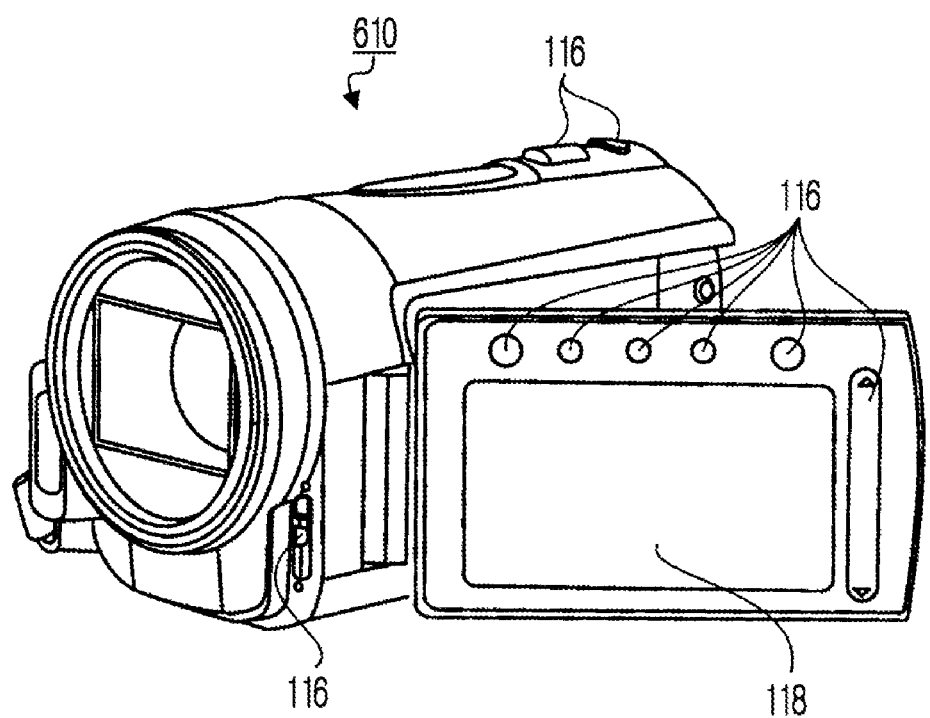
FIG. 19 is an exterior view showing an example of a video data recording device according to the embodiment 4 of the present invention.
Figure 20:
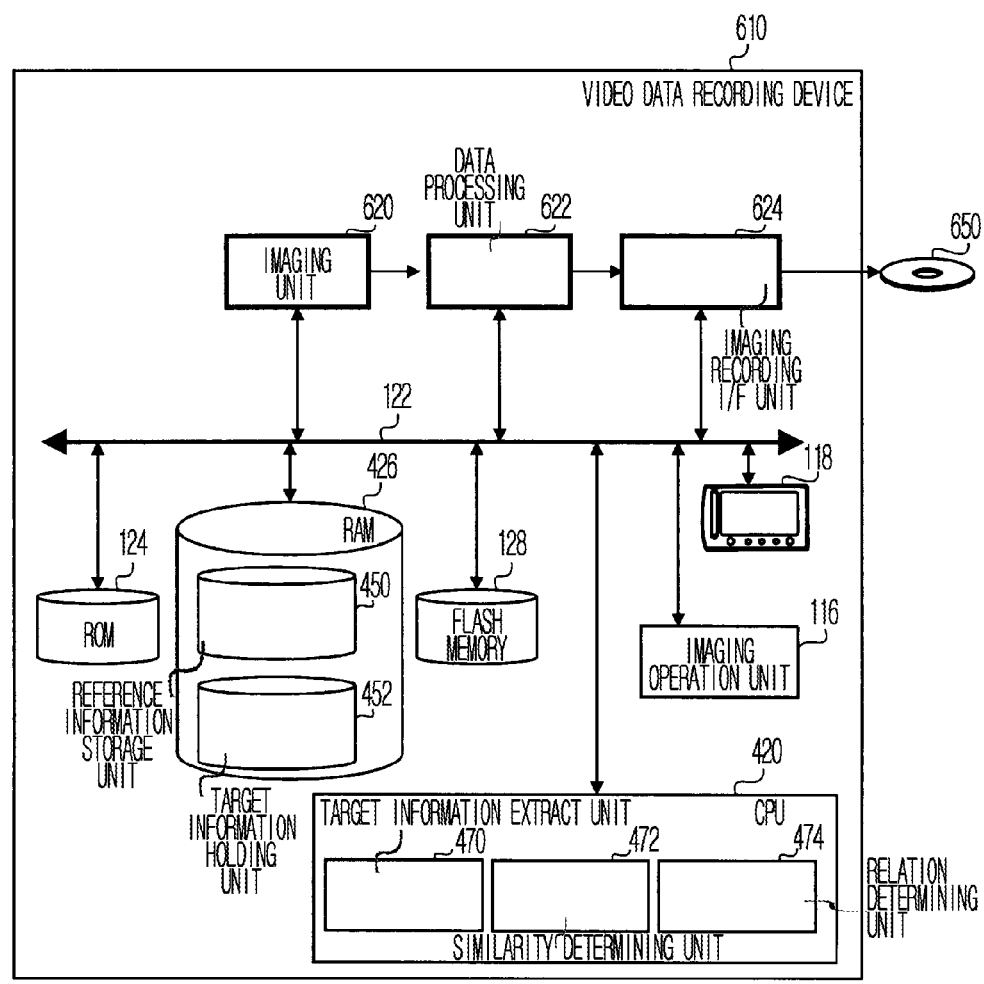
FIG. 20 is a functional block diagram showing a schematic hardware configuration of the video data recording device, according to the embodiment 4 of the present invention.

FIG. 19 is an exterior view showing an example of the video data recording device 610 according to the embodiment 4 of the present invention, and FIG. 20 is a functional block diagram showing a schematic hardware configuration of the video data recording device 610, according to the embodiment 4 of the present invention. In the present embodiment, an example of the video data recording device 610 is a digital video camera, but is not limited thereto, and may be any recording device capable of recording a frame on a recording medium, such as a digital still camera, an HDD recorder, a DVD recorder, a Blu-ray disc recording device, etc.

The video data recording device 610 includes a CPU 420, a bus 122, a ROM 124, a RAM 426, a flash memory 128, an imaging operation unit 116, a view finder 118, an imaging unit 620 functioning as a video data acquisition unit, a data processing unit 622, and an imaging recording I/F unit 624 functioning as a medium recording unit.

The CPU 420, the bus 122, the ROM 124, the RAM 426, the flash memory 128, the imaging operation unit 116, and the view finder 118 substantially have the same functions as the CPU 420, the bus 122, the ROM 124, the RAM 426, the flash memory 128, the imaging operation unit 116, and the view finder 118 described above with respect to the embodiment 1 and 3, and thus the same numerals are given and descriptions thereof are not repeated. Here, the imaging unit 620, the data processing unit 622, and the imaging recording I/F unit 624 in the video data playing device 610 will be mainly described because they have different configurations from those in the embodiment 1 and 3.

The imaging unit 620 generates a frame from a video signal obtained by imaging a subject. The data processing unit 622 forms luminance data or color data with respect to the frame generated by the imaging unit 620. Hereinafter, the frame includes the luminance data or the color data. The imaging recording I/F unit 624 records the generated frame in the predetermined external recording medium 650.

Similarly to the embodiment 3, when the imaging unit 620 operating as the video data acquisition unit acquires the frame, the target information extract unit 470 extracts target information from the frame, and temporarily holds the target information in the target information holding unit 452. The similarity determining unit 472 and the relation determining unit 474 assigns a mask flag to target information determined that a mask process is required.

Also, the imaging recording I/F unit 624 further records related information included in the target information assigned with the mask flag, in the external recording medium 650, besides the frame.

Here, the mask flag is retroactively assigned to the target information, i.e., the related information included in the target information is recorded in the external recording medium 650 after being held in the target information holding unit 452 for a predetermined time. Accordingly, recording timings of the frame and the related information are different, wherein the frame is recorded first and the related information is recorded after a process of assigning the mask flag in the target information holding unit 452 is completed.

Here, the imaging recording I/F unit 624 may record the target information itself in the external recording medium 650, without being limited by the related information. From this configuration, a process load may be reduced by using the target information recorded in the external recording medium 650 later, for example, when the mask flag is again assigned to the target information based on reference information of another person's face.

When the target information constituting the mask target is recognized, the video data recording device 610 assigns a mask flag to target information related to the target information, and records related information related to a partial image specified by the target information on the external recording medium 650. Accordingly, since the mask process starts from a frame including even a part of the mask target when the external recording medium 650 of the present embodiment is played, it is possible to sufficiently protect privacy even before the mask target completely appears in a screen.

Also, since the mask process is performed while playing the video data, the video data recording device 610 does not require the mask process, and thus a load of processes may be reduced. Also, since the frame and the related information, which have not been mask processed, are independently recorded on the external recording medium 650, a user may output the video data by selecting execution or non-execution of the mask process while playing the video data.

Also, unlike the embodiment 3, since it is not required to output the frame after performing the mask process, the video data recording device 610 records the frame (video data) directly on the external recording medium 650 without holding the frame in the video buffer 434, and the target information holding unit 452 is used only in order to determine whether the mask process is performed on the target information. In detail, the similarity determining unit 472 or the relation determining unit 474 of the video data recording device 610 retroactively assigns the mask flag to the target information held in the target information holding unit 452. As such, according to the present embodiment, since the video buffer 434 for temporarily recording the frame is not required, it is possible to reduce manufacturing costs.

Also, according to the configuration of including the imaging unit 620, the video data recording device 610 may record on the external recording medium 650, while imaging the subject, the imaged video data, and the related information for performing the mask process on the partial image specifiable by the target information that is in relation to the frames forming the video data and is assigned with the mask flag. Accordingly, even when individual information is included in the imaginged video data, it is possible to easily generate privacy protected video data.

(Video Data Playing Device 700)

Next, the video data playing device 700 for reading the video data and the related information from the external recording medium 650 recorded by using the video data recording device 610, performing the mask process on the partial image to be mask processed, and outputting the video data will be described.

Figure 21:
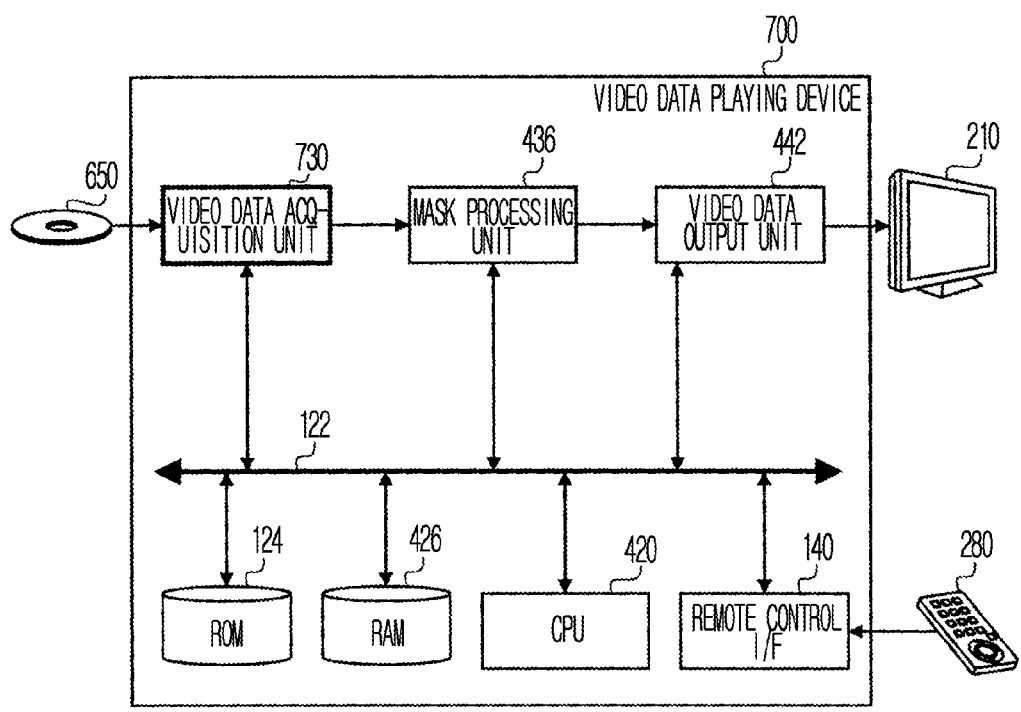
FIG. 21 is a functional block diagram showing a schematic hardware configuration of a video data playing device, according to the embodiment 4 of the present invention.

FIG. 21 is a functional block diagram showing a schematic hardware configuration of the video data playing device 700, according to the embodiment 4 of the present invention. The video data playing device 700 includes a CPU 420, a bus 122, a ROM 124, a RAM 426, a video data acquisition unit 730, a mask processing unit 436, a video data output unit 442, and a remote control I/F 140.

Since the CPU 420, the bus 122, the ROM 124, the RAM 426, the mask processing unit 436, the video data output unit 442, and the remote control I/F 140 substantially have the same functions as the CPU 420, the bus 122, the ROM 124, the RAM 426, the mask processing unit 436, the video data output unit 442, and the remote control I/F 140 described with reference to the embodiment 3, the same numerals are given and descriptions thereof are not repeated. Here, the video data acquisition unit 730 in the video data playing device 700 will be mainly described because they have different configurations from those in the embodiment 3.

The video data acquisition unit 730 acquires the frames forming the video data from the external recording medium 650. Also, the video data acquisition unit 730 acquires the related information from the external recording medium 650.

The mask processing unit 436 performs the mask process on the partial image of the frame specifiable by the related information, and the video data output unit 442 outputs the video data to the display 210.

Here, although data encoding is not described, the data processing unit 622 of the video data recording device 610 may combine a frame with previous and next frames, encode the combined frames in a predetermined encoding method, such as M-JPEG, MPEG-2, or H.264, and transmit the encoded combined frames to the imaging recording I/F unit 624. Here, the video data acquisition unit 730 decodes the frames and transmits the decoded frames to the mask processing unit 436.

As described above, the video data, and the related information capable of specifying the partial image to be mask processed are recorded on the external recording medium 650. Accordingly, when the external recording medium 650 is played, the video data playing device 700 can recognize the mask target almost in real time according to the related information, thereby performing the mask process immediately from a point of time when even a part of the mask target appears on the screen. Accordingly, it is possible to sufficiently protect privacy even before the mask target completely appears in the screen.

Also, since the related information is already in relation to the frame, a process of deriving the mask target is not required, and thus a privacy protected frame may be output in a lower load process. Also, since the video data recorded on the external recording medium 650 has not been mask processed, a user may output the video data by selecting whether to perform the mask process while the external recording medium 650 is read and played by using a playing device.

(Video Data Recording Method)

Next, a video data recording method using the video data recording device 610 will be described by using a flowchart.

Figure 22:
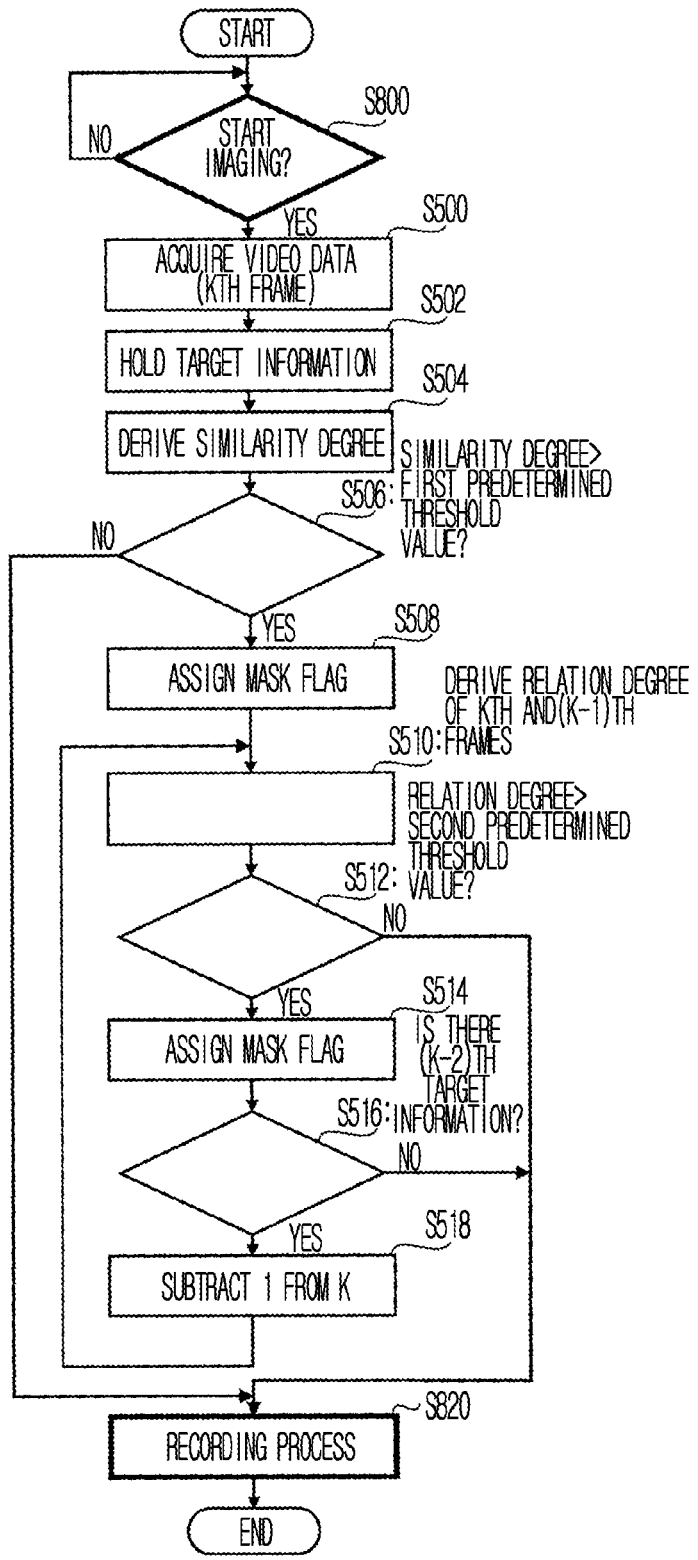
FIG. 22 is a flowchart showing a flow of processes of a video data recording method according to the embodiment 4 of the present invention.

FIG. 22 is a flowchart showing a flow of processes of the video data recording method according to the embodiment 4 of the present invention.

In FIG. 22, when the user starts imaging (YES in S800), the imaging unit 620 as a video data acquisition unit acquires the frames in S500. Then, since an order from the step of extracting and holding the target information in relation to the frame, to the step of assigning the mask flag to the target information to be mask processed is identical to the processes shown in FIG. 17 of the video data playing method according to the embodiment 3, the same numerals are given and descriptions thereof will not be repeated. Lastly, the imaging recording I/F unit 624 records the video data and the related information on the external recording medium 650 in S820.

In the video data recording method, the imaging recording I/F unit 624 records the video data together with the related information on the external recording medium 650. Since the mask process is performed when the video data is played, the mask process is not required in the video data recording method, and thus a load of processes may be reduced.

(Video Data Playing Method)

Next, a video data playing method, in which the external recording medium 650 generated by the video data recording device 610 is played by using the video data playing device 700, will be described by using a flowchart.

Figure 23:
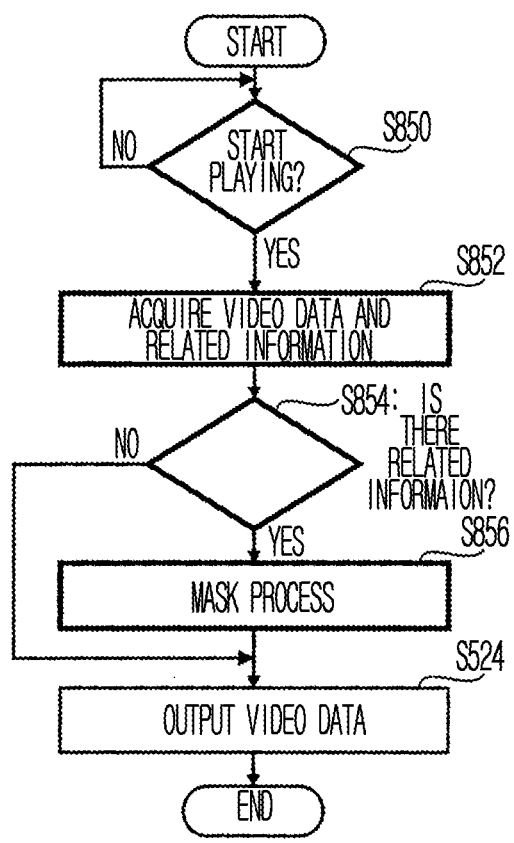
FIG. 23 is a flowchart showing a flow of processes of a video data playing method according to the embodiment 4 of the present invention.

FIG. 23 is a flowchart showing a flow of processes of the video data playing method according to the embodiment 4 of the present invention. In FIG. 23, when the user starts to play the external recording medium 650 (YES in S850), the video data acquisition unit 730 acquires the frames forming the video data, and the related information from the external recording medium 650, in S852.

The mask processing unit 436 determines whether the related information is held in relation to the frame in S854, and if the related information held in relation to the frame (YES in S854), performs the mask process on the partial image of the frame specifiable by the related information in S856. Like the process shown in FIG. 17 of the video data playing method according to the embodiment 3, the video data output unit 442 outputs the frame to the display 210 by frequently changing the frame to the video signal in S524.

In the video data playing method above-described, the video data is mask-processed by referring to the related information recorded in the external recording medium 650 and is output. Here, since the mask target can be easily pre-determined, a process of deriving the mask target is not required, and thus privacy protected video data may be output with a lower load process.

As described with respect to the present embodiment, the load applied during a process is dispersed by assigning the mask flag indicating the mask target when the video data are recorded, and performing the mask process when the video data are played, and thus the privacy protected video data may be output with a lower load. Also, since the video data itself recorded on the external recording medium has not been mask processed, the user may output the video data by selecting whether the mask process is performed.

While this invention has been particularly shown and described with reference to exemplary embodiments thereof, the present invention is not limited thereto, and it will be understood by those skilled in the art that various changes in form and details may be made therein without departing from the spirit and scope of the invention as defined by the appended claims.

For example, in the above embodiments, the video data is described with an example of a moving image encoded in M-JPEG, MPEG-2, H.264, or the like, but is not limited thereto, and may be, for example, a plurality of still images imaged (continuously photographed) with a digital still camera.

Also, each of the process in the video data recording method or the video data playing method does not have to be performed in time series according to the order shown in the flowchart, but may be performed by a parallel process or a process according to a subroutine.

INDUSTRIAL APPLICABILITY

The present invention may be used as a video data recording device, a video data playing device, a video data recording method, and a video data playing method.

The invention claimed is:

1. A video data recording device comprising:
a reference information storage unit in which reference information including predetermined features is recorded;
a video data acquisition unit which acquires video data, comprising first image data of a first frame and second image data of a second frame, the first image data and the second image data being sequential with respect to one another;
a similarity determining unit which derives similarity degree indicating a degree of similarity between the second image data and the reference information, extracts second partial image of the second frame determined to be similar to the reference information from the second image data based on the similarity degree and generates second partial information including the second partial image and information with which it is capable of specifying where the second partial image is located in the second frame;

a relation determining unit which derives relation degree indicating a degree of similarity between the first image data and the second partial information, extracts first partial image of the first frame determined to be related to the second partial information from the first image data based on the relation degree and generates first partial information including the first partial image and information with which it is capable of specifying where the first partial image is located in the first frame, the relation degree when extracting the first partial image being lower than the similarity degree when extracting the second partial image; and a medium recording unit which records the video data, and information related to the first partial information and the second partial information, in a recording medium.

2. The video data recording device of claim 1, wherein the similarity determining unit determines whether the second image data is similar to the reference information based on whether the similarity degree exceeds a first predetermined threshold value, and the relation determining unit determines whether the first image data is related to the second partial information based on whether the relation degree exceeds a second predetermined threshold value, the second predetermined threshold value being smaller than the first predetermined threshold value.

3. The video data recording device of claim 1, wherein the video data acquisition unit comprises an imaging unit that images a subject and generates video data.

4. A video data playing device comprising:

a video data acquisition unit which acquires related information and video data, from a recording medium on which the related information and the video data are recorded, the video data comprising:

first image data of a first frame and second image data of a second frame, the first image data and the second image data being sequential with respect to one another, and the related information comprising:

second partial information including second partial image of the second frame and information with which it is capable of specifying where the second partial image is located in the second frame, the second partial image being determined to be similar to reference information comprising predetermined features based on similarity degree indicating a degree of similarity between the second image data and the reference information, and first partial information including first partial image of the first frame and information with which it is capable of specifying where the first partial image is located in the first frame, the first partial image being determined to be related to the second partial information based on relation degree indicating a degree of similarity between the first image data and the second partial information, and the relation degree when determining the first partial image to be related being lower than the similarity degree when determining the second partial image to be similar;

a processing unit which performs a specific process on the first partial image and the second partial image specified by the related information in the video data; and a video data output unit which outputs the specific-processed video data.

5. A video data playing device comprising:

a reference information storage unit in which reference information including predetermined features is recorded;

a video data acquisition unit which acquires video data, comprising first image data of a first frame and second image data of a second frame, the first image data and the second image data being sequential with respect to one another;

a similarity determining unit which derives similarity degree indicating a degree of similarity between the second image data and the reference information, extracts second partial image of the second frame determined to be similar to the reference information from the second image data based on the similarity degree and generates second partial information including the second partial image and information with which it is capable of specifying where the second partial image is located in the second frame;

a relation determining unit which derives relation degree indicating a degree of similarity between the first image data and the second partial information, extracts first partial image of the first frame determined to be related to the second partial information from the first image data based on the relation degree and generates first partial information including the first partial image and information with which it is capable of specifying where the first partial image is located in the first frame, the relation degree when extracting the first partial image being lower than the similarity degree when extracting the second partial image;

a processing unit which performs a specific process on the first partial image specified by the first partial information and the second partial image specified by the second partial information, with respect to the video data; and a video data output unit which outputs the specific-processed video data.

6. The video data playing device of claim 5, wherein the similarity determining unit determines whether the second image data is similar to the reference information based on whether the similarity degree exceeds a first predetermined threshold value, and the relation determining unit determines whether the first image data is related to the second partial information based on whether the relation degree exceeds a second predetermined threshold value, the second predetermined threshold value being smaller than the first predetermined threshold value.

7. A video data recording method comprising:

recording reference information including predetermined features;

acquiring video data, comprising first image data of a first frame and second image data of a second frame, the first image data and the second image data being sequential with respect to one another;

deriving similarity degree indicating a degree of similarity between the second image data and the reference information, extracting second partial image of the second frame determined to be similar to the reference information from the second image data based on the similarity degree and generating second partial information including the second partial image and information with which it is capable of specifying where the second partial image is located in the second frame;

deriving relation degree indicating a degree of similarity between the first image data and the second partial information, extracting first partial image of the first frame determined to be related to the second partial information from the first image data based on the relation degree and generating first partial information including the first partial image and information with which it is capable of specifying where the first partial image is located in the first frame, the relation degree when extracting the first partial image being lower than the similarity degree when extracting the second partial image; and recording the video data and information related to the first partial information and the second partial information, on a recording medium.

8. A video data playing method comprising:

recording reference information including predetermined features;

acquiring video data, comprising first image data of a first frame and second image data of a second frame, the first image data and the second image data being sequential with respect to one another;

deriving similarity degree indicating a degree of similarity between the second image data and the reference information, extracting second partial image of the second frame determined to be similar to the reference information from the second image data based on the similarity degree and generating second partial information including the second partial image and information with which it is capable of specifying where the second partial image is located in the second frame;

deriving relation degree indicating a degree of similarity between the first image data and the second partial information, extracting first partial image of the first frame determined to be related to the second partial information from the first image data based on the relation degree and generating first partial information including the first partial image and information with which it is capable of specifying where the first partial image is located in the first frame, the relation degree when extracting the first partial image being lower than the similarity degree when extracting the second partial image ;

performing a specific process on the first partial image specified by the first partial information and the second partial image specified by the second partial information, with respect to the video data; and outputting the specific-processed video data.

9. A video data playing device comprising:

a reference information storage unit in which reference information including predetermined features is recorded;

a video data acquisition unit which acquires video data, comprising first image data of a first frame and second image data of a second frame, the first image data and the second image data being sequential with respect to one another;

a target information extract unit which extracts, from the first image data, first target information including predetermined features about first partial image of the first frame and information with which it is capable of specifying where the first partial image is located in the first frame, and which extracts, from the second image data, second target information including predetermined features about second partial image of the second frame and information with which it is capable of specifying where the second partial image is located in the second frame;

a similarity determining unit which derives similarity degree indicating a degree of similarity between the second target information and the reference information, determines whether the second target information is similar to the reference information based on the similarity degree, and assigns a mask flag to second target information determined to be similar;

a relation determining unit which, when it is determined that the second target information is similar to the reference information, derives relation degree indicating a degree of similarity between the first target information and the second target information, determines whether the first target information is related to the second target information based on the relation degree, and assigns the mask flag to the first target information determined to be related, the relation degree when determining the first target information to be related being lower than the similarity degree when determining the second target information to be similar;

a processing unit which performs a specific process according to the mask flag on the first partial image specified by the first target information, and the second partial image specified by the second target information with respect to the video data; and a video data output unit which outputs the specific-processed video data.

10. The video data playing device of claim 9, wherein the similarity determining unit determines whether the reference information and the second target information are similar based on whether the similarity degree exceeds a first predetermined threshold value, and the relation determining unit determines whether the first target information and the second target information are related based on whether the relation degree exceeds a second predetermined threshold value, the second predetermined threshold value being smaller than the first predetermined threshold value.

11. A video data recording device comprising:

a reference information storage unit in which reference information including predetermined features is recorded;

a video data acquisition unit which acquires video data comprising first image data of a first frame and second image data of a second frame, the first image data and the second image data being sequential with respect to one another;

a target information extract unit which extracts, from the first image data, first target information including predetermined features about first partial image of the first frame and information with which it is capable of specifying where the first partial image is located in the first frame, and which extracts, from the second image data, second target information including predetermined features about second partial image of the second frame and information with which it is capable of specifying where the second partial image is located in the second frame;

similarity determining unit which derives similarity degree indicating a degree of similarity between the second target information and the reference information, determines whether the second target information is similar to the reference information based on the similarity degree, and assigns a mask flag to the second target information determined to be similar;

a relation determining unit which, when it is determined that the second target information is similar to the reference information, derives relation degree indicating a degree of similarity between the first target information and the second target information, determines whether the first target information is related to the second target information based on the relation degree, and assigns the mask flag to the first target information determined to be related, the relation degree when determining the first target information to be related being lower than the similarity degree when determining the second target information to be similar; and a medium recording unit which records the video data, and information related to the first target information assigned with the mask flag and the second target information assigned with the mask on a recording medium.

12. The video data recording device of claim 11, wherein the similarity determining unit determines whether the second target information and the reference information are similar based on whether the similarity degree exceeds a first predetermined threshold value, and the relation determining unit and determines whether the first target information and the second target information are related based on whether the relation degree exceeds a second predetermined threshold value, the second predetermined threshold value being smaller than the first predetermined threshold value.

13. The video data recording device of claim 11, wherein the video data acquisition unit comprises an imaging unit that generates video data by imaging a subject.

14. A video data playing device comprising:
a video data acquisition unit which acquires related information and video data, from a recording medium on which the related information and the video data are recorded,
the video data comprising:
first image data of a first frame and second image data of a second frame, the first image data and the second image data being sequential with respect to one another, and
the related information comprising:
second target information including predetermined features about second partial image of the second frame and information with which it is capable of specifying where the second partial image is located in the second frame, the second partial image being extracted from the second image data by being determined to be similar to reference information including predetermined features based on similarity degree indicating a degree of similarity between the second image data and the reference information, and
first target information including predetermined features about first partial image of the first frame and information with which it is capable of specifying where the first partial image is located in the first frame, the first partial image being extracted from the first image data by being determined to be related to the second target information based on relation degree indicating a degree of similarity between the first image data and the second partial information, and the relation degree when determining the first partial image to be related being lower than the similarity degree when determining the second partial image to be similar;
a mask processing unit performing a mask process on the first partial image and the second partial image specified by the related information, with respect to the video data; and
a video data output unit which outputs the mask processed video data.

15. A video data playing method comprising:
recording reference information including predetermined features;
acquiring video data, comprising first image data of a first frame and second image data of a second frame, the first image data and the second image data being sequential with respect to one another;
extracting, from the first image data, first target information including predetermined features about first partial image of the first frame and information with which it is capable of specifying where the first partial image is located in the first frame, and extracting, from the second image data, second target information including predetermined features about second partial image of the second frame and information with which it is capable of specifying where the second partial image is located in the second frame;
deriving similarity degree indicating a degree of similarity between the second target information and the reference information, determining whether the second target information is similar to the reference information based on the similarity degree, and assigning a mask flag to the second target information determined to be similar;
if it is determined that the second target information is similar to the reference information, deriving relation degree indicating a degree of similarity between the first target information and the second target information, determining whether the first target information is related to the second target information based on the relation degree, and assigning the mask flag to the first target information determined to be related, the relation degree when determining the first target information to be related being lower than the similarity degree when determining the second target information to be similar;
performing a mask process according to the mask flag on the first partial image specified by the first target information and the second partial image specified by the second target information, with respect to the video data; and
outputting the mask processed video data.

16. A video data recording method comprising:
recording reference information including predetermined features;
acquiring video data comprising first image data of a first frame and second image data of a second frame, the first image data and the second image data being sequential with respect to one another;
extracting, from the first image data, first target information including predetermined features about first partial image of the first frame and information with which it is capable of specifying where the first partial image is located in the first frame, and extracting, from the second image data, second target information including predetermined features about second partial image of the second frame and information with which it is capable of specifying where the second partial image is located in the second frame;
deriving similarity degree indicating a degree of similarity between the second target information and the reference information, determining whether the second target information is similar to the reference information based on the similarity degree, and assigning a mask flag to second target information determined to be similar;
if it is determined that the second target information is similar to the reference information, deriving relation degree indicating a degree of similarity between the first target information and the second target information, determining whether the first target information is related to the second target information based on the relation degree, and assigning the mask flag to the first target information determined to be related, the relation degree when determining the first target information to be related being lower than the similarity degree when determining the second target information to be similar; and recording the video data and information related to the first target information assigned with the mask flag and the second target information assigned with the mask flag on a recording medium.

17. A video data playing device of claim 4, wherein the specific process is a masking process comprising at least one of a mosaic process, a fog process and a coloring process.

18. A video data playing device of claim 5, wherein the specific process is a masking process comprising at least one of a mosaic process, a fog process and a coloring process.

19. A video data playing method of claim 8, wherein the specific process is a masking process comprising at least one of a mosaic process, a fog process and a coloring process.

20. A video data playing device of claim 9, wherein the specific process is a masking process comprising at least one of a mosaic process, a fog process and a coloring process.

* * * * *